US006824639B1

(12) United States Patent
Hill et al.

(10) Patent No.: US 6,824,639 B1
(45) Date of Patent: Nov. 30, 2004

(54) PARTIAL IMAGING OF A SUBSTRATE WITH SUPERIMPOSED LAYERS

(75) Inventors: Geroge Roland Hill, Stockport (GB); Andrew Walter N. Clare, Stone (GB)

(73) Assignee: Contra Vision Ltd., Cheshire (GB)

( * ) Notice: Subject to any disclaimer, the term of this patent is extended or adjusted under 35 U.S.C. 154(b) by 0 days.

(21) Appl. No.: 09/890,570

(22) PCT Filed: Feb. 3, 2000

(86) PCT No.: PCT/IB00/00267

§ 371 (c)(1),
(2), (4) Date: Sep. 25, 2001

(87) PCT Pub. No.: WO00/46043

PCT Pub. Date: Aug. 10, 2001

(51) Int. Cl.[7] ......................... B44C 1/165; B32B 31/18; B32B 3/10; G02B 17/00; G02B 5/00

(52) U.S. Cl. ....................... 156/230; 156/239; 156/240; 156/247; 156/250; 156/257; 428/131; 428/137; 428/201; 428/912.2; 428/914; 359/591; 359/601; 359/839

(58) Field of Search ................................ 156/230, 231, 156/234, 235, 239, 240, 247, 277, 287, 270, 250, 256, 257; 428/142, 131, 137, 195, 201, 912.2, 914; 359/594, 601, 839, 591

(56) References Cited

U.S. PATENT DOCUMENTS 1,199,882 A * 10/1916 Frey ........................... 359/839
3,826,167 A * 7/1974 Pelet et al. .................... 83/171
4,102,101 A 7/1978 Nielsen et al.
4,321,778 A * 3/1982 Whitehead ................... 52/397
4,673,609 A * 6/1987 Hill ............................ 428/187
4,925,705 A 5/1990 Hill
5,026,584 A * 6/1991 Logan ......................... 428/41
5,112,423 A * 5/1992 Liebe, Jr. .................... 156/234
5,312,645 A * 5/1994 Dressler ..................... 427/148
5,344,680 A * 9/1994 Logan et al. ................. 428/40
5,609,938 A 3/1997 Shields
5,773,110 A 6/1998 Shields
5,830,529 A 11/1998 Ross
6,210,776 B1 4/2001 Hill
6,212,805 B1 4/2001 Hill
RE37,186 E 5/2001 Hill
6,258,199 B1 * 7/2001 Lingamfelter et al. ...... 156/235
6,267,052 B1 7/2001 Hill et al.

FOREIGN PATENT DOCUMENTS

EP 0 170 472 A 2/1986
EP 0 234 121 A 9/1987
FR 2 575 114 6/1986
FR 2700500 7/1994

(List continued on next page.)

*Primary Examiner*—J. A. Lorengo
(74) *Attorney, Agent, or Firm*—Pillsbury Winthrop LLP

(57) ABSTRACT

A method of partially imaging an imaging surface of a substrate (50) with a plurality of layers of marking material (10) which have at least one common boundary within a print pattern that covers only certain portions of the substrate and not other portions of the substrate. The method includes applying initial superimposed layer of marking material (10) to a base layer (23) and removing portions of the initial superimposed layers of marking material and leaving the desired residual layer portions in the desired print pattern directly applied to the imaging surface of the substrate. The method typically includes the transfer of marking material onto the imaging surface of the substrate. The method has many variants, which can be used to make one-way or other vision control panels, typically using a ceramic ink decal carrier to image a glass sheet with ceramic ink that is then fused onto the glass, which is optionally tempered, in a suitable furnace. Other uses include security printing, seals and labels and a variety of display panels.

29 Claims, 17 Drawing Sheets

FOREIGN PATENT DOCUMENTS

Figure 1A:
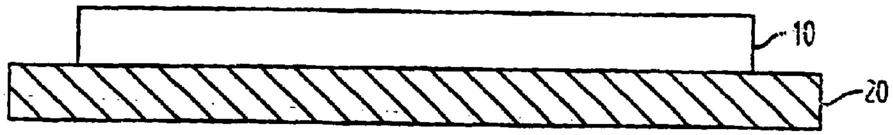

| | | | |
|---|---|---|---|
| GB | 2118096 | A | 10/1983 |
| GB | 2165292 | A | 4/1986 |
| GB | 2174383 | A | 11/1986 |
| GB | 2188873 | A | 10/1987 |
| JP | 51033723 | | 3/1978 |
| WO | WO 97/15453 | | 5/1997 |
| WO | WO 97/25213 | | 7/1997 |
| WO | WO 97/47481 | | 12/1997 |
| WO | WO 98/17480 | | 4/1998 |
| WO | WO 98/43832 | | 10/1998 |

* cited by examiner

PARTIAL IMAGING OF A SUBSTRATE WITH SUPERIMPOSED LAYERS

This application is the National Phase of International Application PCT/IB00/00267 filed Feb. 3, 2000 which designated the U.S. and that International Application was published under PCT Article 21(2) in English.

This invention concerns the partial imaging of a substrate with superimposed layers of marking material in the form of a print pattern with substantially exact registration. This methodology can be used to manufacture vision control panels, especially glass printed with ceramic ink.

A vision control panel may be defined as a light permeable material imaged with a print pattern which subdivides the panel into a plurality of imaged areas and/or a plurality of non-imaged areas. The visual properties of the light permeable material are consequently amended and are typically also dependent upon the illumination conditions on either side of the panel.

One type of vision control panel is a panel comprising a sheet of light permeable material with a design or a single colour visible from one side of the panel which is not visible from the other side of the panel, the design or single colour being superimposed on or forming at least a part of an opaque "silhouette pattern" which subdivides the panel into a plurality of opaque areas and/or a plurality of light permeable areas.

Vision control panels, typically comprising transparent materials partially imaged with a pattern of opaque marking material, are well known. U.S. Pat. No. 4,102,101 (Neilsen et al) discloses toughened glass having a pattern of white ceramic ink dots to form the walls of a squash court. By having relatively bright illumination inside the squash court and relative darkness outside, the wall surface is visible to the players and forms an adequate background against which to sight a squash ball, at the same time allowing visibility inside the court by spectators. This one-way effect is similar to that provided by net curtains or sheers. U.S. Pat. No. 4,321,778(Whitehead) discloses another type of one-way vision control panel for squash courts, having a layer of black dots, superimposed by white dots, the black dots improving the visibility into the court by spectators and TV cameras. Whitehead discloses in detail methods of manufacturing such panels using ceramic ink waterslide transfers. GB2 118 096 (Hill and Yule) discloses the protection of white on black dots and other patterns within plastic panels and methods of forming such white on black patterns. GB2 165 292 (Hill) discloses panels of transparent or translucent material having a design on one side not visible from the other side, the design being superimposed on or forming a part of a silhouette pattern. Eight basic methods are disclosed in GB2 165 292 of making such panels. Each of these eight method descriptions typically disclose several variations within each method, an example of each method 1–8 being illustrated in FIGS. 18–25, respectively, of GB2 165 292.

Another type of vision control panel is described in WO97/25213 (Hill) comprising a transparent or translucent sheet and a transparent or translucent "base pattern" of a different colour to the "neutral background" of the sheet. Methods of imaging such panels are disclosed including the imaging of a plurality of projecting surfaces defining the base pattern. GB2 174 383 B (Easton and Slavin) discloses methods of decorating glass by means of waterslide transfer.

GB2 188 873 (Hill) discloses methods and uses for methods of printing superimposed layers with substantially exact registration, including the manufacture of printed circuits and membrane switches, and obtaining the desired colour rendering of ink on non-white substrates and certain backlit illuminated displays, together with fifteen improvements to security printing, labels and seals. These methods rely on the removal of unwanted ink from a printed substrate to leave layers in substantially exact registration.

JP333/78 (Kawai), WO97/15453 (Hill) and WO98/17480 (Hill and Godden) disclose other methods of partially imaging substrates, including the selective transfer of marking material to preformed or selectively predated substrate. WO97/47481 (Mueller and Bird) discloses many methods of partially imaging substrates by digital techniques including electrostatic and thermal transfer techniques.

Method 2 of GB2 165 292 discloses the use of a transfer to form a panel according to the invention and, in particular, the use of a ceramic ink transfer in which the design and silhouette pattern are incorporated into the transfer by "method 1 or any other method," then transferred to glass, the ceramic ink then being fused into the glass during a toughening process. One "other method" disclosed is method 8 in which a "film material can be punched, burnt, laser cut or otherwise cut normally to achieve a perforated membrane of a grid, net or filigree type of silhouette pattern, the holes of whatever shape forming the transparent areas. The holes may be formed after printing or otherwise applying the required design "blocked out" or the required design may be produced after the holes have, been formed . . . " Such perforated sheets or membranes imaged with a design may then be formed within or attached to a transparent sheet. Precision Studios of Stoke-on-Trent, UK, a division of Josiah Wedgwood & Sons Ltd. developed the method according to GB2165292 of first printing ceramic ink transfer carrier material, the transfer carrier material and the printed ceramic ink then being perforated together. Samples of toughened glass panels produced by such printed then perforated ceramic ink transfers were first made public bearing the Precision Studios'name in 1996. U.S. Pat. No. 5,830,529 (Ross) also discloses the method of perforating ceramic decals.

Other methods of utilising perforated materials to form partially imaged panels according to GB2 165 292, for example, for advertising on the windows of buses, taxis and retail outlets, typically manufactured by screen or digitally printing a design on a pre-perforated self-adhesive vinyl assembly, have been in widespread use since 1993. U.S. Pat. No. 5,609,938 (Shields) and U.S. Pat. No. 5,773,110 (Shields) both disclose a perforated clear facestock material and an additional solid backing liner which have been incorporated into products made and sold since September 1993 by Visual Technologis, Inc. of Pineville, N.C. USA, as evidenced and available for public inspection in the reissue of U.S. Pat. No. 5,609,938 (Shields) file Ser. No. 09/267,025 at the U.S. Patent and Trademark Office GB2 118 096 (Hill and Yule), GB2 165 292 and U.S. Pat. No. 5,830,529 also disclose the edge alignment of superimposed layers, by means of applying layers to a projecting surface which automatically aligns their perimeters with the downstand edge of the projecting surface, and by means of a recessed surface which automatically aligns the layer perimeters to the upstanding edge.

International Patent Application WO98/43832 (Pearson) discloses the partial imaging of a transparent glass substrate by means of a perforated decal on a carrier. In PCT/GB98/00803, the word "perforated" is used to mean having a plurality of holes, not limited to a process of piercing through a material.

PCT/GB98/00803 discloses and claims the methodology of heat release transfers being automatically applied and also discloses three methods of forming vision control panels using an unperforated ceramic heat release transfer. One of these methods is the combination of method 2 in GB2 165 292 with previously known ceramic ink heat release transfer technology. Another is GB2 165 292 method 4 (stencil method) in conjunction with previously known ceramic ink heat release transfer technology, which is used to transfer ink layers over a stencil printed directly onto a glass sheet. In addition, WO98/43832 discloses the selective application of a heat release layer to a ceramic ink heat release transfer carrier, intended to facilitate the selective application of ceramic ink to a sheet of glass as a means of manufacturing vision control panels. In all the methods of WO98/43832, the ceramic ink is removed from the transfer carrier by means of a uniform layer of heat-activated adhesive.

Contra Vision Supplies Ltd of Stockport, UK and Precision Studios developed a process of using unperforated ceramic ink transfers by a combination of GB2 165 292 methods 2 and 1, the latter as improved by the 'Through Combination Method' of WO97/15433 (Hill), and a resultant vision control panel was placed in the public domain in the USA and Austalia in March 1998 and exhibited at the Glastec '98 exhibition in Dusseldorf, Germany, in September 1998.

GB2 165 292 method 1 and the 'Through Combination Method' of WO97/15433, as used to make these disclosed panels, do not produce a design superimposed on a silhouette pattern with substantially exact registration. These combined methods of partially imaging a substrate enable an acceptable vision control panel to be made in spite of the errors in registration of conventional methods of printing, such as screenprinting.

While vision control panels having multiple layers of ink in substantially exact registration can be made by means of perforated transfers, the method has the disadvantage of the reduction in strength of the perforated material caused by the holes. During the transfer process, this leads to difficulties in applying the perforated decal or perforated decal and perforated decal carrier to a sheet of glass, the transferred material being liable to rupture and folding, both of which spoil the finished appearance of the panel. Additionally, such difficulties severely limit the size of perforated material that can be transferred to a sheet of glass. Also, the perforation of ceramic ink decals by mechanical punching is expensive because the punching tools become relatively worn because of the presence of glass 'frit' (finely ground glass) in the ceramic ink.

The stencil method disclosed in WO98/43832 has the disadvantage of requiring the separate process of the application of the stencil pattern to a sheet of glass prior to the application of the transferred ceramic material. Printing directly onto glass is a cumbersome and time-consuming process, primarily owing to the difficulties of handling heavy glass panels. Transfer processes of printing on glass have been developed and adopted for this reason and because it is possible to print successive applications of ink in better registration onto a decal carrier than onto a large sheet of glass.

The selective application of a heat release agent to a ceramic ink heat release transfer carrier, as disclosed in WO98/43832, does not result in a practical process. The heat applied to the paper surface to melt the heat release agent and activate the heat-activated adhesive on the other side of the transfer must heat all the heat-activated adhesive. The desired ink is supposed to be selectively transferred to the glass, leaving the unwanted ink on the transfer carrier. No indication is given as to how this method is supposed to work. The heat-activated adhesive is uniformly applied over the ceramic ink on the transfer and the heat is uniformly applied in the transfer machine by heated roller and optionally by pre-heated glass and therefore the adhesive uniformly adheres the ink to the glass. The adhesion of the ceramic ink to the carrier and the internal adhesive strength of the ceramic ink would need to be sufficient to enable an ink fracture mechanism and to overcome the adhesion of the ink to the glass outside the areas of the heat release agent in order for ink that is unwanted on the substrate to be retained on the decal carrier. Even assuming this method could be made to work, in spite of the overall layer of heat-activated adhesive, the resultant edges of the transferred pattern would be irregular owing to "underbreak" or "overbreak" of ink from the fracture inducing edges of the heat release agent, which are remote from the glass surface.

JP63071385 (Dai Nippon) (abstract) discloses the transfer of superimposed ink layers from a transfer base material onto a transparent substrate by means of "heat-adhesive transparent resin ink". This adhesive material forms part of the resultant panel and separates the ink layers from the substrate and this prior art does not disclose or relate to ceramic ink transfers.

Known methods of transfer include:

(i) indirect methods, for example waterslide transfers and indirect heat release transfers, and (ii) direct methods, for example direct heat release transfers.

A transfer process comprises material to be transferred, commonly referred to as a decal (abbreviation of decalcomania), being transferred from a transfer carrier, commonly referred to as a decal carrier, onto a substrate surface.

An indirect transfer method is one in which the means of release of the decal from the decal carrier and the means of adhering the decal to the substrate are typically combined in a single layer on the transfer carrier. The decal is first removed from the carrier and then positioned on the substrate.

For example, a ceramic ink waterslide transfer typically comprises a mass-produced decal carrier, typically a specially prepared paper with a sealant layer and a water-soluble adhesive layer. This is optionally printed or otherwise coated with a downcoat, typically a methyl methacrylate based lacquer. It is then printed with the desired layers of ceramic ink or vitreous enamel ink forming the required image and then a covercoat is applied, typically a methyl methacrylate based lacquer. This transfer assembly is typically soaked in water and the decal comprising the covercoat, ceramic ink, optional downcoat and some adhering water-soluble adhesive is released from the carrier and then applied by hand to the substrate surface to be decorated.

As another example, an indirect ceramic ink heat release transfer typically comprises a mass-produced decal carrier, comprising a paper, a sealant layer, a combined heat-activated release and adhesive layer, typically a modified wax incorporating an adhesive or tackifire blend. This is optionally printed or otherwise coated with a downcoat, typically a methyl metcacrylate lacquer. It is then printed with the desired layers of ceramic ink and then a covercoat is applied, typically a methyl methacrylate based lacquer. The decal is then released by applying heat, typically by a heated steel plate under the paper, which activates the release/adhesive layer and allows the decal to be removed from the carrier and then be transferred to and adhered to the substrate to be decorated.

A direct transfer method is one in which a transfer assembly is applied directly to a substrate and the decal carrier is released and removed, leaving the decal on the substrate.

For example, a direct ceramic ink heat release transfer typically comprises a mass-produced decal carrier comprising a paper, a sealant layer and a heat release layer, typically a polyethylene glycol (PEG) wax. This is optionally printed with a covercoat, typically a non-film-forming covercoat. It is then printed with the desired layers of ceramic ink. Any design is printed in reverse to its intended orientation from the ink side of the substrate. Then a heat-activated adhesive layer is applied, for example a methacrylate resin. This transfer assembly is then typically positioned directly against the substrate with the adhesive layer against the substrate surface. Heat is applied via the paper, which simultaneously activates the adhesive layer and the separate heat release agent. This enables the decal of adhesive, ceramic ink and any covercoat to be adhered to the substrate and be transferred from the carrier, the carrier being released and removed from the decal and substrate. The substrate may optionally be pre-heated.

The term covercoat and downcoat are always used in relation to their position with respect to the substrate, a covercoat being a layer over the ink on the substrate and a downcoat being a layer adhered to the substrate, underneath the ink on the substrate.

Typical substrates onto which ceramic decals are transferred include ceramic holloware, ceramic flatware, hollow glassware and flat glass.

Ceramic ink typically comprises glass "frit," metal oxide pigments and a binding medium of solvent, resin and plasticiser. Ceramic ink may contain an oil, such as pine oil. Ceramic inks can be opaque or translucent.

All the above transfer materials and methods are well known in the art.

Many automatic methods of decal application have been devised, for example all the mechanical processes, firing ovens and furnaces described in WO98/43832 were well known in the art before the priority date of that patent application.

After ceramic ink is applied to a normal sheet of flat glass, sometimes referred to as float glass and sometimes referred to as annealed glass, the printed sheet of glass is then typically subjected to a thermal regime of up to a temperature of typically 576° C., which bums off all components of the ceramic ink other than glass frit and pigment and melts the glass frit and fuses the remainder of the ink onto the glass, typically followed by relatively slow cooling to anneal the glass once again, which process will be referred to as an ink fusing regime. Optionally, annealed glass substrates with ceramic ink can undergo a tempering or toughening regime, which involves raising the glass temperature to typically between 670° C. and 700° C., in which temperature range the glass is relatively soft, and then cooling it relatively quickly, typically by cold air quenching. This causes differential cooling of the glass sheet, the two principal surfaces solidifying before the core solidifies. The subsequent cooling and shrinkage of the core causes a zone of precompression adjacent to each principal surface. The physical strength properties of the glass sheet are fundamentally changed by this glass tempering or toughening regime, which imparts a considerably improved flexura strength to the resultant tempered or toughened glass.

Such a glass tempering or toughening regime may be carried out after a separate ink fusing regime or as one process, the ink being fused onto the glass as part of that one process.

With either the ink fusing regime or the glass tempering regime, any transfer process adhesive, covercoat, downcoat and ceramic ink medium are burnt off in the furnace and do not form part of the resultant panel.

According to the present invention, there is a method of imaging an imperforate substrate on a substantially uniform imaging surface of said substrate so as to provide said substrate with a print pattern, said print pattern comprising at least two superimposed layers of marking material, said print pattern comprising at least one of said at least two layers of marking material on first portions of said substrate and devoid of both of said at least two layers of marking material on other portions of said substrate, and said at least two superimposed layers of marking material having at least one length of common boundary within said print pattern, said method including applying at least two initial superimposed layers of said marking material onto a base layer and removing portions of said initial superimposed layers of said marking material from said base layer by means of a force selectively applied to said marking material being supported by said base layer at the time of said removing, and wherein said substrate has at least one substantially different material property to said base layer, and wherein at least one surface of said at least two layers of marking material is applied directly in contact with said imaging surface of said substrate.

In a first embodiment, the method includes applying at least two initial superimposed layers of said marking material onto a base layer and removing portions of said initial superimposed layers of said marking material from said base layer by means of a force selectively applied to said marking material being supported by said base layer at the time of said removing, transferring the marking material remaining on said base layer to said first portions of said substrate, and wherein at least one surface of said at least two layers of marking material is applied directly in contact with said imaging surface of said substrate.

In a second embodiment, the method includes applying at least two initial superimposed layers of said marking material onto a base layer, transferring said at least two initial superimposed layers of said marking material to said substrate by means of a force selectively applied to said marking material being supported by said base layer at the time of said removing, removing portions of said initial superimposed layers of said marking material from said substrate, and wherein at least one surface of said at least two layers of marking material is applied directly in contact with said imaging surface of said substrate.

In a third embodiment, the method includes applying a base layer to said imaging surface of said substrate, applying at least two initial superimposed layers of said marking material onto said base layer, removing portions of said initial superimposed layers of said marking material from said base layer by means of a force selectively applied to said marking material being supported by said base layer at the time of said removing, and wherein said base layer is removed from said substrate, and at least one surface of said at least two layers of marking material is applied directly in contact with said imaging surface of said substrate.

In a fourth embodiment, the method includes applying at least two initial superimposed layers of said marking material onto a substrate and removing portions of said initial superimposed layers of said marking material from said substrate by means of a force selectively applied to said marking material being supported by said substrate at the time of said removing, and wherein said substrate is transmuted by means of energy applied to said substrate such that the transmuted substrate has at least one substantially different material property to said substrate, and wherein at least one surface of said at least two layers of marking material is applied directly in contact with said imaging surface of said transmuted substrate.

The print pattern for a vision control panel is typically a pattern of dots, straight or curved lines or other plurality of discrete elements of marking material and/or a plurality of areas devoid of marking material, for example in the form of a grid, net or filigree pattern. The print pattern may be uniform or non-uniform, such as in a vignette pattern, for example as typically applied to vehicle windows.

There are many variants of this method. All include the process of applying to a base layer a plurality of initial superimposed layers of marking material "blocked out" or "solid", meaning in continuous layers that require areas of marking material to be removed to form the desired print pattern. The initial continuous layers of marking material, typically printed ink, may be in many forms. For example, they may extend over the whole area of the print pattern and the portions to be unimaged within the print pattern. Two or more such layers may be superimposed and each layer may be of any material and of any colour or other property. Such layers may act as a background layer to a design. A design extending over only part of the area of the print pattern and comprising one or more continuous layers may be applied to one or both sides of one or more of such background layers. Such initial arrangements of marking material, typically ink, will typically be referred to hereinafter as initial layers of marking material or initial layers of ink.

It should be understood that the term marking material is intended to include any imaging material that is identifiable within the visible or non-visible spectrum, including ink, paint, toner, powder, metallic deposits, gaseous materials as in a dye sublimation process, photosensitive materials, heat sensitive materials and other materials which may be rendered visible or the visibility of which maybe amended by electricity or other energy source. The initial layers of marking material may be applied by any means, including dip-coating techniques, spraying, printing by any means such as screenprinting, offset litho printing, flexographic printing, gravure printing, any digital printing system, such as electrostatic, inkjet, thermal transfer, dye sublimation, photographic or thermographic systems or by vacuum metalization.

A base layer has a primary surface onto which the initial layers of marking material are applied and to which at least one of the layers of marking material is directly applied. The base layer may comprise a single homogeneous material, a plurality of layers of the same or different materials and may be a primary base layer comprising said primary surface and be adhered to a secondary base layer which is releasable from the primary base layer, optionally by an intermediate release layer. The secondary base layer may also comprise a plurality of layers. A base layer, a primary base layer or a secondary base layer may be in the form of a transfer carrier or decal carrier typically comprising a paper or other filmic material, to which is typically applied a sealing layer and a release layer and which may have on its other surface an "anti-blocking" or anti-friction surface typically to prevent this surface in a roll or stack of unimaged or imaged decal carrier material becoming stuck to an adjacent surface.

The primary surface of the base layer may be the surface of a paper or filmic or sheet material, a sealing layer, a release layer, an adhesive layer, another coating layer for example a material which is disposable by any means including being capable of being "burnt off" in a furnace, being destroyed by any radiation such as UV radiation or being dissolved. The primary surface of the base layer may be an overall uniform layer or a partial layer, for example of marking material applied in a previous process. The base layer may be rigid, flexible, compressible, conformable and of any shape. The base layer may be capable of being transmuted or transformed into the substrate having a substantially different material property to the base layer, typically by the application of an energy source, such as thermal energy. For example a sheet of normal, annealed glass may undergo a thermal regime to convert it to tempered or toughened glass, as previously described, with a substantially increased flexural strength. As another example, a base layer material may be changed in visual appearance. Polyvinyl butyral film, which is commonly used to laminate glass, typically changes from a translucent material to a transparent material upon the application of heat and pressure in the glass lamination process.

The substrate has an imaging surface to which the print pattern of superimposed layers of marking material is ultimately or residually applied and is in direct and intimate contact with at least one of the layers of marking material. Substrate materials may be of any material or materials, in any external shape and internal structure, including homogenous, laminar or cellular structures. The substrate may be any suitable organic or inorganic material, for example, plastic sheet, plastic film, metal, paper, card, aerogel, composites such as carbon fibre reinforced resin, laminates of any of the above materials, or other organic or inorganic substance. Substrates may be pre-coated, for example with bonding agents, print receptive treatments or be partially metallised or completely metallised, for example to form a mirror, one-way mirror or other reflective surface. Substrates may comprise one or more layers of substantially uniform marking material.

The substrate may be rigid, flexible, compressible or conformable. The imaging surface of the substrate may be plane or curved, preferably of single curvature in any cross-section.

A transparent material is defined herein as one capable of transmitting light or other electromagnetic radiation so that objects or images beyond can be clearly perceived by the human eye or other device.

A translucent material is defined herein as a material which admits and diffracts light so that objects beyond cannot be clearly perceived.

An opaque material is defined herein as a material which is substantially impervious to the passage of light.

The terms transmute or transform as used herein mean to change form from one nature, form, condition, state or material property to another.

The term "to transfer" means to shift or move from one surface to another.

Variants of the method, typically describing different ways of forming the initial superimposed layers of marking material and different methods of removing the unwanted marking material, include the following methods:

1.

A first group of methods include the Mechanical Removal of Unwanted Marking Material by a force selectively applied to initial layers of marking material.

1.+

In a first method initial superimposed layers of marking material are applied to a base layer. Unwanted ink is then mechanically removed to leave superimposed layers of marking material on the base layer in the desired print pattern with substantially exact registration. The base layer is then transmuted or transformed into the finished transmuted substrate with at least one substantially different material property. For example, a sheet of annealed glass is printed with initial superimposed layers of ceramic ink, at least one layer covering the glass in a layer to the outer edges of the required silhouette pattern. To manufacture one type of vision control panel according to GB2 165 292, the annealed glass is typically covered with a layer of black ceramic ink, then one or more layers of white ceramic ink and then printed with one or more design layers, each layer being cured by conventional means, for example by heat in an oven and/or air drying tunnel.

Ceramic ink typically comprises finely ground glass "frit", a pigment material typically of metallic oxide, the frit and pigment bound by a medium of solvent, resin and plasticiser. In this initially cured state, the ink is still of a relatively soft texture, typically requiring heat treatment in a furnace to achieve its hardened state in a finished sheet of decorated glass.

The unwanted ink is then removed from the area to be transparent by mechanical means, which may include:

(i) scraping by a comb tool, for example replacing a squeegee blade on a screen printing bed, (ii) scraping by an array of chisel blades, or (iii) abrading by an array of abrading wheels or abrading nozzles, for example high pressure air nozzles.

Such ink removal will typically leave a silhouette pattern of lines with the layers of ceramic ink in substantially exact registration. The annealed glass and ceramic ink then are subjected to a glass tempering or toughening regime including raising the glass temperature within the range of typically between 670° C. and 700° C., then cooling rapidly, typically by air quenching. This results in tempered or toughened glass with a zone of precompression adjacent to each of the two principal surfaces, the tempered or toughened glass having a substantially higher flexural strength than the annealed glass forming the untreated base layer.

1.2

A second method is similar to the first method, except that before mechanical removal of the unwanted marking material by one of the techniques described, the layers of marking material are first pre-cut, for example with an array of flat blades or circular disc blades. The blades are easily available, such as Stanley knife blades manufactured by Stanley Tools Ltd of Sheffield, UK, or alternatively may be specially prepared. In precutting a pattern of lines, it is preferable for the blades to be singly ground rather than double ground, for example at an angle of 20–45 degrees to the opposite unground surface of the blade, each blade then being used so that the unground side is applied to the edge of a line to be retained, the blade being positioned outside this line and the ground edge facing towards the portion of ink to be subsequently removed. Individual blades or groups of blades may be sprung or subjected to a hydraulic pressure to ensure that each and every blade is applied with appropriate pressure so as to cut through the ceramic ink. Such pre-cutting facilitates the removal of unwanted ink to clean cut edges of the required print pattern. Chisels or other scraping tools of less width than the pre-cut edges of a print pattern can be used and the membrane tensile strength of the ink ensures that the unwanted marking material is cleanly removed up to the pre-cut edges. With pre-cut edges, even relatively blunt tools can be used to remove the unwanted ink, including the end of steel wire.

1.3

A third method is similar to the first method, except that the substrate has a base layer of a different material applied to one surface, for example by coating, printing or lamination. The base layer to which the layers of marking material are then applied can have one or more uses, including:

(i) forming a transparent frangible or soft layer to assisting the complete removal of the unwanted coloured ink without leaving coloured residue on the portions to be transparent, or (ii) forming a scratch resistant layer to protect the substrate, and/or (iii) acting as a slip plane, or (iv) acting as a raft to support the unwanted ink and thereby assisting its clean removal.

In either case, the base layer may optionally be removed from the finished product, for example by a heat process which burns off the base layer.

For example, a sheet of annealed glass is coated with a base layer, for example of clear methyl methacrylate lacquer, preferably a non-film-forming coat. This is overprinted with initial superimposed layers of ceramic ink and the unwanted ink is removed, for example by one of the techniques in the first method. The base layer assists the removal of all of the unwanted coloured ink layers, as required to form the desired silhouette pattern. When subjected to an ink fusing or glass tempering regime, the base layer is burnt off leaving the desired layers of ceramic ink in substantially exact registration in the desired silhouette pattern, fused onto the glass substrate.

1.4

A fourth method is similar to the third method except that the initial superimposed layers of marking material and optionally the base layer are pre-cut as in the second method. It has been found that a non-filming-forming, semi-brittle base layer is particularly advantageous as a raft to the unwanted marking material, as described in item (iv) in method 1.3. Chisels or other scraping tools of less width than the pre-cut edges of a print pattern can be used and the membrane tensile strength of the ink and/or the supporting raft effect of the base layer ensure that the unwanted marking material is cleanly removed up to the pre-cut edges. As with method 1.2, relatively blunt tools including wire can be used to remove pre-cut unwanted marking material.

All the remaining method variants utilise transfer (decal) technology.

1.5

In a fifth method, unwanted marking material is mechanically removed from a transfer carrier. The remaining layers of marking material form the desired print pattern superimposed with substantially exact registration and are then transferred onto a substrate.

For example, to manufacture a vision control panel, a direct ceramic ink heat release decal carrier typically comprising paper and the paper preferably coated with a sealing layer and coated with a heat release layer such as a wax material, is optionally coated with a covercoat, preferably a non-film-forming frangible covercoat. It is then printed with initial superimposed layers of ceramic ink, typically comprising a background layer of one colour and another background layer of another colour. The ceramic ink layers are initially cured as in the conventional manufacture of ceramic ink transfers, for example by heat in an oven and/or air drying tunnel. Then the decal is typically coated with a beat-activated adhesive.

The ceramic ink which is unwanted in the finished vision control panel is selectively removed from the ceramic ink decal carrier, for example by one of the techniques in the first method, to leave superimposed layers of ceramic ink in substantially exact registration within the desired silhouette pattern. In this fifth method, when the unwanted ink is removed, the carrier paper or the surface sealing treatment of the carrier paper or optional covercoat under the ceramic ink is exposed between the lines of superimposed ink. The ceramic ink decal is then transferred to a sheet of glass, typically by passing the printed and processed transfer assembly through rollers with the sheet of glass, the roller adjacent to the transfer being heated and the glass optionally being pre-heated, as well known in the art.

In the case of a ceramic ink waterslide transfer, one or more layers of methyl methacrylate downcoat are optionally applied to the decal carrier, optionally followed by a non-film-forming frangible downcoat, before the initial superimposed layers of ceramic ink. Following the selective removal of unwanted ink, by mechanical means, a covercoat of methyl methacrylate lacquer is applied over the superimposed layers of ceramic ink and the exposed areas between, to provide a continuous film layer that will support the ceramic ink upon application of water, thereby enabling transfer of the ceramic ink decal from the decal carrier to a sheet of glass.

In the case of an indirect ceramic ink heat release transfer, the conventional process is followed up to and including the application of the initial superimposed layers of ceramic ink. Unwanted ceramic ink is then selectively removed by mechanical means to leave residual layers of ceramic ink in the layout of the desired print pattern followed by an overall application of a methyl methacrylate covercoat and normal transfer thereafter.

After such waterslide or heat release transfer of the ceramic ink in the desired superimposed layers in the desired silhouette pattern in substantially exact registration, subsequent heat treatment fuses the ceramic ink into the glass, which may optionally be heat treatment to form toughened glass, all as well known in the art and as previously described.

1.6

A sixth method is similar to the fifth method except that before the removal of unwanted marking material from the decal carrier, the edges of the required print pattern are first cut, for example with an array of flat knife blades or circular disc blades, as in the second method. This sixth method may also use either waterslide or indirect heat release or direct heat release transfer. For any indirect transfer, a downcoat layer should typically be film-forming, as this aids ink removal after it has been cut.

By selection of suitable materials, it has been found with ceramic ink transfers that the width of an individual chisel blade or other ink removal tool can be of less width than the width of the ceramic ink to be removed, which nevertheless is pulled away from the decal carrier to the full extent required, up to the precut lines. The membrane tensile strength of the ceramic ink and/or the tensile strength or supporting "raft" effect of any downcoat or covercoat adjacent to the decal carrier ensure the ink to be removed holds together. As with methods 1.2 and 1.4, relatively blunt tools including wire can be used to remove the pre-cut unwanted marking material. This unexpected feature assists the setting up of such a production line, allowing a tolerance between the positioning of the pre-cutting blades and the edges of the chisels or other means of ink removal.

The scraped ink can then be efficiently disposed of, for example by blowing or suction.

2.

A second group of methods includes the use of a Heated Profiled Roller, which selectively applies an adhesive force on the initial superimposed layers of marking material.

2.1

In method 2.1, a heated profiled roller is used in conjunction with a direct transfer assembly to selectively remove unwanted marking material from initial superimposed layers of marking material on a decal carrier, leaving the desired print pattern of marking material layers to be transferred to the substrate by conventional means. For example, to manufacture a vision control panel, a direct ceramic ink heat release transfer is conventionally produced to incorporate initial superimposed layers of ceramic ink. The ink not required to be in the silhouette pattern is transferred by means of a heated, profiled roller from the decal carrier to the heated profiled roller, from which it is subsequently removed. The profiled roller has been cast, lathe cut, ground or otherwise formed with the negative of the required pattern projecting from its surrounding surface area or areas. For example, a profiled roller comprising an array of projecting cylindrical elements applied to the heat-activated adhesive surface will selectively remove lines of unwanted ink from the decal carrier by activating the adhesive across the width of the cylindrical elements and activate corresponding widths of release agent. For example, with the described direct ceramic ink heat release transfer assembly, within the width of an individual cylinder, of width approximating to that of the intended transparent lines, the heat-activated release layer will be melted and the heat-activated adhesive converted to its adhesive state, thus removing the unwanted width of ceramic ink from the decal carrier onto the individual cylinder. A scraping blade subsequently removes the unwanted ink from each cylinder of the heated roller. By conventional transfer means, the lines of ceramic ink remaining on the decal carrier are transferred from the decal carrier to a sheet of glass. The transferred ceramic ink and glass then undergo a heat treatment process, such as one of those previously described, to fuse the ceramic ink onto the glass.

2.2

Method 2.2 is similar to method 2.1 except that the edges of the desired print pattern are pre-cut, as in the sixth method, 1.6. For example, using a direct ceramic ink heat release transfer, the layers of heat-activated adhesive, ceramic ink and, optionally, a downcoat are all pre-cut. The cylindrical elements can advantageously be narrower than the pre-cut widths of unwanted ink and still remove all the unwanted width of ink, owing to the tensile membrane strength of the decal layers. This feature assists the setting up of a production line with reasonable tolerances between the pre-cutting and ink removal stages.

2.3

In method 2.3, a heated profiled roller is used to selectively transfer the desired print pattern of marking material onto a substrate from a direct transfer decal carrier. For example, to make a vision control panel, a conventional direct ceramic ink heat release transfer carrier is printed with initial superimposed layers of ceramic ink, as in method 2.1. The ink required to be in the silhouette pattern is transferred to a sheet of glass by means of a heated, profiled roller that has been cast, lathe cut, ground or otherwise formed with the required silhouette pattern projecting from its surrounding surface area or areas. For example, a profiled roller comprising an array of projecting cylindrical elements will selectively apply the required heat process to the transfer and thus transfer a pattern of superimposed ceramic ink lines to the sheet of glass. Within the width of an individual cylinder, of width approximating to that of the intended line of ceramic ink, the heat-activated release layer will be melted and the heat-activated adhesive converted to its adhesive state, thus adhering the desired width of ceramic ink to the glass. The adhesive force between the adhesive lines and the glass and the adhesive lines and the ink surface pulls away the desired lines of ceramic ink from the carrier by means of the ink fracturing either side of each line and the unwanted ink between lines of the silhouette pattern being removed on the carrier by the carrier being pulled away from the glass. Thus, an array of lines is transferred from the ceramic ink decal carrier to the glass by the selective adhesive force exerted on the surface of the ceramic ink remote from the decal carrier, in a pattern of lines. The transferred ceramic ink and glass then undergo a heat treatment process, such as one of those previously described.

2.4

Method 2.4 is similar to method 2.3, except that the heat-activated adhesive layer, the initial superimposed layers of marking material and, optionally, the heat release agent are pre-cut, for example by one of the methods in the sixth method, which removes the need for the marking material fracture mechanism required in method 2.3. In the example production of a vision control panel, the projecting roller cylinders can be of narrower width than the ink to be transferred, the tensile membrane strength of the ink layers being sufficient to pull the ink from the whole width required to be transferred up to the pre-cut lines. This arrangement assists the setting up of such a production line, allowing a tolerance between the positioning of the cutting blades and the edges of the individual cylinders on the heated, profiled roller.

2.5

Method 2.5 is similar to method 2.3, except that the heat-activated adhesive is selectively applied to the marking material in the form of the desired print pattern, which assists the accurate production of the desired print pattern. For example, in the production of a vision control panel, the required ink fracture mechanism of ceramic ink on a direct ceramic ink heat release transfer is initiated at the edges of the heat-activated adhesive printed in the form of the desired silhouette pattern. This allows the ceramic ink to be transferred onto a sheet of glass, in the desired silhouette pattern. The desired vision control panel is completed following a previously described heat treatment regime.

3.

A third group of methods relies on the selective application of the adhesive layer in a transfer assembly, to define the desired print pattern and apply a selective force onto the initial superimposed layers of marking material to form the required print pattern.

3.1.

In method 3.1, selective application of both the adhesive layer and release layer on a direct transfer effects the transfer of the print pattern only from the decal carrier. For example, to produce a vision control panel, the heat release agent in a direct ceramic ink heat release transfer assembly is selectively applied to the decal carrier in the form of the desired silhouette pattern of the vision control panel. The initial superimposed layers of ceramic are then applied and the heat-activated adhesive layer is also selectively applied in the form of the desired silhouette pattern, in as close register as possible to the selectively applied heat release agent. Normally decal carriers are constructed to facilitate ink removal. However, in this case a layer of ink adhesion enhancer or bonding agent is advantageously selectively applied between the selectively applied release layer or is applied continuously under or over the selectively applied release layer. When the direct ceramic ink heat release transfer is passed through a conventional transfer machine, the ceramic ink forming the desired silhouette pattern is simultaneously adhered to the glass and released from the carrier and transfers to the glass sheet. The unwanted ink remains on the decal carrier by means of an ink fracture mechanism along the edges of the silhouette pattern. The ceramic ink and glass then undergo an ink fusing or glass tempering heat regime.

3.2

In method 3.2, only the heat-activated adhesive is selectively applied over the initial superimposed layers of marking material in the form of the desired print pattern, the heat release layer being continuous across the decal carrier. For example, heat-activated adhesive is selectively applied onto the initial superimposed ceramic ink layers of a direct ceramic ink heat release transfer. When the ceramic ink heat release transfer is passed though the transfer machine all the release layer is activated, allowing the removal of all of the initial superimposed layers of ink from the carrier by the adhesive force exerted by the selectively applied adhesive, onto the glass. The force to remove the ceramic ink is selectively applied to the ceramic ink surface remote from the transfer carrier. At this juncture, or after heat treatment up to less than the temperature that would incur bonding of the ceramic ink to the glass, the unwanted ink between the selectively applied adhesive can be removed by a number of methods, such as air jetting or water jetting or the application and removal of self-adhesive tape. The bond of the heat-activated adhesive to the glass is sufficient to retain the ink adhered to it, while the ink ruptures at the edges of the heat-activated adhesive, thus defining the edges of the silhouette pattern and allowing the removal of unwanted ink.

3.3

Method 3.3 is similar to method 3.2 except that the selectively applied heat-activated adhesive forms a stencil of the desired silhouette pattern, such that when the glass and the initial superimposed layers of ceramic ink are subjected to sufficient temperature to bake the ink onto the glass or to fuse the ink into the glass, the stencil formed by the heat-activated adhesive acts as a barrier against such adhesion and/or fusion. The ceramic ink outside the stencil, inside the desired silhouette pattern, is baked onto the glass or is fused onto the glass, as required. There are several alternative means of enabling the removal of the stencil and the ceramic ink above it. For example, an expansive agent can be incorporated within the stencil, thus bursting off the ink above the stencil, for example during a thermal cycle, or the stencil allows the removal of the stencil and the ink above it, for example by air jetting or water jetting or the application and removal of adhesive film. When the unwanted ink has been removed, a further heat regime may be required in order to fuse the ink into the glass and, if required, toughen the glass.

While methods 3.1, 3.2 and 3.3 have been described in relation to direct transfers, methods 3.2 and 3.3 can be practised with indirect transfers having a continuous release layer adjacent to the decal carrier, then a selectively applied adhesive layer, which is then overprinted with the initial superimposed layers of marking material, then preferably a covercoat in the case of ceramic ink transfers, typically a methyl methacrylate lacquer.

4.

A fourth group of methods utilises a direct transfer with a stencil of the desired print pattern printed over the initial superimposed layers of marking material and adhesive, the adhesive exposed between the stencil portions exerting a selective force to remove layers of marking material from the decal carrier.

4.1

In method 4.1, a beat-activated adhesive is applied in a continuous layer over the initial superimposed layers of marking material on a direct transfer and an additional stencil layer is selectively applied to the heat-activated adhesive surface, the stencil being the negative of the desired print pattern. The heat release layer is also selectively applied but in the form of the required print pattern. On undergoing a conventional transfer process, the desired print pattern is selectively transferred to the substrate. For example, using a direct ceramic ink heat release transfer, the ceramic ink layers rupture along the edges of the silhouette pattern owing to the adhesive force selectively applied outside the stencil area with corresponding release from the decal carrier. The unwanted ink is retained on the decal carrier along with the stencil material.

4.2

Method 4.2 is similar to method 4.1, except the release layer is continuous, allowing the whole of the decal to transfer to the substrate. Upon transfer, the selectively applied stencil layer prevents the adhesion of the transferred decal above the stencil pattern to the substrate, thus enabling the removal of the stencil and the marking material above it immediately following this process or after a further heat regime, as described in method 3.3. In the making of a vision control panel, the initial superimposed layers of ceramic ink are removed from a decal carrier by the force of the heat-activated adhesive selectively applied to the ceramic ink surface remote from the carrier, outside the stencil pattern. The unwanted ink and the stencil are then removed, for example by air jetting or water jetting immediately after transfer or after a further heat process. The panel with the required silhouette pattern of ceramic ink is then subject to an ink fusing or glass tempering regime.

4.3

Method 4.3 is similar to method 4.2 except that the stencil is applied between the ceramic ink layers and the adhesive layer.

5.

A fifth group of methods utilises a stencil of the required print pattern applied to a decal carrier before applying the initial superimposed layers of marking material.

5.1

In method 5.1, a stencil of the required print pattern is applied to a decal carrier of either a direct or indirect transfer, before application of the initial superimposed layers of marking material. The stencil and the unwanted marking material are removed before transfer of the desired layers of marking material in the desired print pattern onto the substrate.

For example, a waterslide ceramic ink decal carrier is optionally first printed with one or more layers of downcoat, typically a methyl methacrylate downcoat to increase the strength of the resultant decal. A heat expandable stencil is printed, being the negative of the desired silhouette pattern of a vision control panel. The initial superimposed layers of ceramic ink are then printed and the decal is subjected to a temperature that will cause the stencil to expand and "burst off" the ink directly above it, which is removed along with the stencil material, for example by air jetting or by vacuum. A covercoat of methyl methacrylate based lacquer is then applied overall the transfer, and the ceramic ink decal comprising the covercoat, the required layers of ceramic ink in the desired print pattern and any downcoat are then transferred to a sheet of glass in the normal manner. The unwanted ink is removed by the selective force exerted by the stencil expanding.

Alternatively, the stencil may be a perforated material. For example, a perforated self-adhesive film assembly typically comprising a polyvinyl chloride film facestock material, a pressure-sensitive adhesive and a release liner are perforated to leave a perforated facestock, a perforated adhesive layer and a perforated liner.

The perforated liner is removed and replaced with a conventional decal carrier having a release surface, this assembly falling with the invention of U.S. Pat. No. 5,858,155. In the case of an indirect, waterslide ceramic ink transfer, an optional downcoat of methyl methacrylate and the initial superimposed layers of ceramic ink are then applied over the perforated material. The perforated self-adhesive vinyl is then removed with the ceramic ink immediately above it. A covercoat, typically of methyl methacrylate, is then applied over the ceramic ink and area from where the ceramic ink has been removed. This assembly is then wetted to enable transfer of the decal to a sheet of glass. In the case of a direct ceramic ink transfer, a heat-activated adhesive layer is applied over the initial superimposed layers of ceramic ink before the perforated self adhesive vinyl stencil is removed with the ceramic ink and heat-activated adhesive directly above it. Alternatively, a downcoat in the case of an indirect transfer or a topcoat in the case of a direct transfer can be applied to the decal carrier before the application of the perforated film stencil to the decal carrier, this layer typically of methyl methacrylate assisting the transfer of the complete decal after removal of the unwanted ink.

The decal is transferred to a glass sheet in a conventional manner and the ink is fused onto the sheet of glass.

5.2

In method 5.2, a stencil of the required print pattern is printed onto a direct or indirect decal carrier and transferred with the initial superimposed layers of marking material onto the substrate. The stencil and the marking material immediately above it are then removed to leave the desired layers of marking material in the required print pattern with substantially exact registration. For example, to manufacture a vision control panel, a stencil is printed onto the water soluble gum of a waterslide transfer, before printing the initial superimposed layers of ceramic ink and a methyl methacrylate lacquer covercoat to assist transfer. The stencil therefore lies under the initial superimposed layers of ceramic ink after transfer to a sheet of glass. When the glass is subjected to a heat regime, the stencil prevents the ceramic ink bonding to the glass. The stencil may optionally be expansive under heat and burst off the ink above it. Alternatively, the stencil and unwanted ink are removed, for example by air jetting or water jetting or by the application and removal of self-adhesive tape or other means, to leave superimposed layers of ink in substantially exact registration within the desired silhouette pattern.

The ceramic ink decal is removed from the decal carrier, after wetting the transfer, preferably by the selective application of a force throughout the area of the decal, typically by means of suction through an array of small holes in a suction apparatus that assists the transfer process, especially valuable when used with transfers of relatively large area, say above 0.5 $m^2$ area. A suitable suction device is described later.

6.

Method 6 relates to an improvement of existing methods using a perforated base layer, such as disclosed in GB2 165 292 and also disclosed in U.S. Pat. No. 5,030,529. In this method, a decal carrier has initial superimposed layers of marking material applied to it and the decal carrier and layers of marking material are then perforated together. For example, to manufacture a vision control panel, a ceramic ink decal carrier is printed with initial superimposed layers of ceramic ink and the carrier and ceramic ink are then perforated. The perforated ceramic ink is then transferred to a sheet of glass.

In the case of a ceramic ink waterslide transfer, a downcoat would typically be applied to the decal carrier before the initial superimposed layers of ceramic ink, to improve the transferability of the decal. As a further improvement to the prior art method, the ceramic ink is overprinted before perforation with one or more covercoats of clear methyl methacrylate lacquer, to provide increased strength to the perforated decal, to allow it to remain dimensionally stable and be positioned accurately on the glass sheet.

In the case of a direct ceramic ink heat release transfer, the perforated ceramic ink being transferred is supported by the perforated paper carrier. However, one or more layers of downcoat, typically of methyl methacrylate, will assist the clean perforation of the ceramic ink.

In accordance with the improvement of the present invention, one or more additional binding layers, typically of methyl methacrylate lacquer, may be applied intermediate the layers of ceramic ink to aid clean perforation of the holes and/or effective transfer to the glass. The ceramic ink itself may optionally contain a higher proportion of resin and/or plasticiser, again to assist perforation and/or transfer.

Alternatively, the decal carrier, whether for direct or indirect transfer, is perforated before applying the ceramic ink layers. An improvement to this method comprises the use of a saturated paper or other substantially non-porous filmic material, to prevent absorption by exposed perforated paper of printed ink constituents.

Also, in accordance with the present invention, the transfer process may be assisted by a layer of unperforated material, such as a low-tack self-adhesive vinyl strengthening the perforated transfer material. In the case of an indirect transfer, this is preferably applied to the perforated covercoat or perforated ink, reinforcing the perforated decal. Also preferably, the self-adhesive vinyl is supported by a suction deck as described herein, while the wetted decal carrier is peeled off from the decal and self-adhesive vinyl. The decal and self-adhesive vinyl are then transferred to the substrate, optionally by a suction deck as described herein, and the self-adhesive vinyl is then peeled off the decal which remains on the substrate. In the case of a direct transfer, the unperforated material is applied to the side of the perforated decal carrier remote from the ink, thus facilitating the direct transfer of the decal, for example by means of the suction deck described herein.

After transfer of the perforated decal, the glass and ceramic ink are then subjected to a thermal regime, typically to fuse the ceramic ink into the glass, optionally to form toughened glass, all as previously described.

It should be understood that the above method variants are examples and are not limiting.

In any of the above methods, the initial superimposed layers of marking material may contain one or more design layers. A design layer does not extend over every portion of the print pattern. The term design layer includes one or more "spot" colour layers, a multi-colour printing process such as a four colour process, a five colour process or a hexachrome process, or a combination of any of these, for example a four colour process with an additional one or more "spot" colour layers. The marking material layers can be applied by any means, for example coated, screenprinted, litho printed, digitally printed, for example by a digital ink jet printer, sprayed or air bushed.

In all the above methods using ceramic ink, it can be advantageous to introduce one or more interlayers of clear glass flux or glass frit with a clear medium, typically of solvent, resin and plasticiser (essentially a clear ceramic ink with no pigments), to separate layers of differently coloured ceramic ink, to reduce the risk of these becoming intermixed during firing. Such additional interlayers are particularly beneficial between the black and white and white and coloured layers used to form vision control panels, to assist the production of separate, opaque ceramic ink layers. It can also be advantageous to introduce single or multiple layers of covercoat and/or downcoat and/or one or more binding layers between successive layers of marking material, to assist decal transfer, perforation or other decal treatment. U.S. Pat. No. 5,830,529 and WO98/43832 only refer to producing perforated layers of ceramic ink, in which the ink is interconnected and thus has an overall tensile or membrane strength. The methods outlined herein enable the production of dot, line and other print patterns comprising discrete elements which may be held in the desired spatial relationship and satisfactorily transferred in large size transfers, even considerably greater than the industry standard of typically 80 cm×60 cm.

While the above methods are described principally in relation to ceramic ink transfers, they are applicable to the transfer of other types of marking material, onto glass or other substrates, such as the transfer of organic inks onto plastic sheet materials, a subsequent curing regime or heat treatment being typically applied to suit the particular type of ink and substrate.

Also, it should be understood that the invention is applicable to other permutations of known transfer technology, for example a direct transfer could have a water-soluble adhesive and a water-soluble release layer, or a heat-activated adhesive and a water-soluble release layer, or a water-soluble adhesive and a heat-activated release layer. In the case of a direct transfer with a water-soluble adhesive and a water soluble release layer, the adhesive can be first activated and then the release, or both can be simultaneously activated with differential tack, which can be provided by the selection of appropriate adhesives or the pre-heating of the substrate, such that the decal carrier can be removed while the decal remains on the substrate. The invention also applies to other means of decal adhesion or release. For example, the adhesive could be a pressure-sensitive adhesive.

Stencil materials used in any method variant may have characteristics to assist removal, for example under heat, UV or other initiator or activator, the stencil may expand, shrink, degrade, melt or be vaporised, to assist the removal of the stencil and the unwanted ink above it. For example, a stencil of gum arabic will shrink under heat, thus facilitating the removal of the unwanted ink above and the stencil itself.

As another example, the stencil material may be volatile at a temperature below that required to bond and/or fuse ceramic ink to glass, the change in state bursting off the unwanted ink in a pre-heat treatment, the disturbed ink then being completely removed, for example by vacuum, brushing, air jetting or water jetting.

A whole range of micro-encapsulation technology is applicable for:

(i) adhesives, for example lubricants to enable the adhesive to be relocatable, (ii) transfer release mechanisms, and (iii) stencil materials in any of the above method variants, for example encapsulated blowing agents.

The micro-encapsulations are typically opened by one of a range of initiators, such as pressure, heat, solvent, UV, infrared or exposure to visible light. For example, layers adjacent to one side of a glass sheet may be subject to UV rays from the other side of the glass sheet, for example for selective curing of UV ink through a mask of the required silhouette pattern on the one or other side.

Catalytic components may also be located on surfaces to be joined by transfer process or be in different micro-encapsulations on the same surface or be mixed prior to use. Such technologies may be used for many purposes, for example to create overall or selective adhesion, stencil barriers to adhesion, the curing of inks and the release of decal carriers.

For simplicity, the production of a print pattern of straight lines has been typically described in the above methods. However, a variety of print patterns is possible with any of these methods. For example, the ink removal methods 1.1 to 1.6 can be used to remove lines of ink in orthoganal directions to achieve a print pattern of discrete rectangles. Oscillating chisels and, where appropriate, oscillating knife blades can produce curved line print patterns. Alternatively, the ink on a transfer carrier can be pre-cut by laser to any desired print pattern, prior to the removal of unwanted ink. Laser cutting can be assisted by the incorporation of a reflective material, such as a metal foil, on the decal carrier. This enables an optical laser to monitor and control the depth being cut by a cutting laser, reflected light from the optical laser indicating that the required depth of cut has been reached, enabling it to control the cutting laser accordingly. This dual laser technology is well known. In methods 2.1 to 2.5, the heated roller defining the print pattern can have a projecting pattern of curved lines, dots or other discrete areas or have an interconnected surface with a plurality of recesses. In methods 2.5 and 3.1 to 3.3, the selectively applied adhesive can be printed or otherwise applied in patterns other than a line pattern, for example a pattern of dots or other discrete areas or in an interconnected pattern such as a grid, net or filigree pattern. In methods 4.1, 4.2, 5.1 and 5.2, the stencil material can be applied in any pattern including lines, dots or other discrete areas or an interconnected pattern.

A novel form of suction apparatus suitable for transferring ceramic ink or other types of transfer or decal comprises a lightweight, high strength, stiff, “stressed skin” structure typically comprising two plane parallel sheets of material forming upper and lower “skins”, having a high strength-to-weight ratio, for example formed from carbon fibre reinforced resin or glass reinforced resin or aluminium or titanium or acrylic. A cellular web core construction connects the two skins, typically in the form of a square, triangular or honeycomb grid of plane webs, which results in an extremely stiff construction. The apparatus is typically used to transfer filmic material onto the surface of a substrate, such as a horizontal sheet of glass. The web members have voids sufficient to provide interconnected cells of air forming an air plenum, the perimeter remaining sealed. The lower skin is perforated with an array of small holes and a suction pump is connected to the plenum such that a suction force can be exerted through each hole in the lower skin onto a surface over which the perforated lower skin is placed, upon the operation of the suction pump. Such a suction apparatus may be termed a “suction deck”. The thickness of the suction deck, typically 10–30 mm, is primarily designed to suit the skin material and plan dimensions of the suction deck. Similar suction arrangements are known in the art of screen printing machinery, forming a screen printing suction ‘bed,’ their purpose being to hold down a substrate while the screen printing squeegee is being operated, to prevent movement of the substrate caused by the squeegee action. The suction deck of the present invention acts in the opposite direction, as a lifting device. The suction deck is positioned above and directly onto a material to be transferred and, by the application of a partial vacuum, the pressure of the air in the plenum is reduced below ambient air pressure. The suction deck then forms an effective means of lifting, for example a decal from a waterslide decal carrier or the whole of a direct transfer assembly, which can then be repositioned onto a substrate.

In the case of a ceramic ink waterslide transfer, the removal of the ceramic ink from the decal carrier is effected by the selective application of force at the surface remote from the carrier, typically suction applied through circular holes in a regular layout on the suction deck. The holes are typically small, say 0.1–1 mm diameter, to avoid undue deformation at the hole positions of the transferred ceramic ink and any covercoal More than one covercoat layer is optionally beneficial, for such means of transfer, to build up sufficient membrane strength to avoid undue distortion within the suction holes that could otherwise leave air holes between the transferred ceramic ink decal and glass at these positions. An alternative means of eliminating this potential problem is to add a layer of material with a microporous, open-cell, air permeable structure to eliminate the concentrations of suction force at hole positions in the lower skin. After the application of the suction force to the side of the decal remote from the transfer carrier, the transfer carrier is wetted and the carrier paper peeled away. Conventional indirect decals are dimensionally unstable after removal from the decal carrier, especially for large decals of greater than say 80 cm×60 cm. The suction deck maintains the dimensional stability of the decal throughout the transfer process.

The suction deck may be easily manhandled, being of lightweight construction, and thus accurately located over the glass. Alternatively, it may be attached to a robotic arm or x-y plotter device, for example to enable the automatic and accurate positioning of a decal onto a sheet of glass. The suction deck may be used to particular advantage in conjunction with glass handling equipment, such as is typically used to enable the accurate drilling of holes in sheets of glass. A glass sheet can be automatically moved on a roller bed to a desired position, controllable to great accuracy. Use of an accurately and automatically positionable suction deck with such existing automatic glass handling equipment provides a much more accurate and economic solution to the positioning of decals onto large sheets of glass than existing manual techniques or automatic roll-to-roll techniques. These benefits apply especially to the application of decals onto large sheets of glass, for example of width greater than 1.2 m (4 ft). Typically, an optical device will "read" the location of two reference points printed onto a decal and transmit this information to a controlling computer which can then position the suction deck and supported decal to the required position over the glass, according to pre-entered co-ordinate data. When it is required to release the decal onto the glass, the air pressure inside the plenum is changed to positive air pressure, greater than the ambient air pressure. Decals can be aligned on a sheet of glass to a tolerance of less than 3 mm (⅛"), enabling "tiling" of decals, to cover large overall areas. Such stressed skin constructions arc extremely stiff. Whatever the arrangement to support the suction deck, it will typically be designed to have a maximum relative deflection between any two points on the suction deck lower surface of less than 3 mm, preferably less than 0.5 mm, when loaded with the material to be transferred. The lower skin may optionally be constructed with a small, concave precamber to ensure that transferred material is applied from its centre outwards.

This type of suction deck apparatus can also be adopted for the application of direct transfers, in which the decal is retained on the decal carrier until the decal is applied to the surface of the substrate. For the application of heat release transfers, hot air is introduced into the plenum to activate the heat release agent and heat-activated adhesive. Alternatively the suction deck may be heated by other means, for example conduction through a suitable skin material, such as aluminium. The substrate, for example glass, may optionally be preheated. If the suction deck is suitably supported, overall pressure can also be applied to the transferred material. Optionally, radiant heat may subsequently be applied, preferably onto a decal carrier having a black surface on the side remote from the ceramic ink. Alternatively, a glass sheet and pre-positioned decal may be passed through heated rollers before removing the transfer carrier.

Optionally, the suction deck is equipped with a vibrating device, for example comprising an eccentrically weighted rotating element, for example driven by electric motor attached to the structure of the suction deck. The resultant vibration assists release of one surface from another, for example of a suction held decal from its carrier.

Perforated decals can be handled by the suction deck after the addition of a non-perforated layer to the perforated decal carrier and/or decal to be transferred, the non-perforated layer typically being a self-adhesive film material.

All the above methods numbered 1.1 to 6 are advantageous over the prior art. They are unified by the means of removing marking material from a base layer by means of a selectively applied force over the area of the base layer. The force is applied by a means which does not form a substantial part of the resultant partially imaged substrate. This selectively applied force typically defines the print pattern.

The above methods are all advantageous over the stencil method of WO98/43832, which requires the printing of two different surfaces, a decal and a sheet of glass, as well having the handling difficulty and relative inaccuracy of printing a pattern onto glass, particularly if the glass is of large size.

The WO98/43832 method of selective application of beat release agent within a heat release transfer is clearly impractical, as previously described, and would not enable an accurate silhouette pattern to be formed. Even if a combination of ink strength, adhesion of the heat-activated adhesive to the glass and ink and adhesion of the ink to the carrier could be found to make the method work, the force to remove the ink from the carrier would be uniformly (not selectively) applied by the uniform layer of adhesive, leading to an imprecise print pattern.

Thus all the methods described distinguish and distinguish advantageously over the prior art methods.

These methods will now be described by way of example with reference to the accompanying figures, in which similar parts of different embodiments have been given the same reference numerals, and in which:

FIGS. 1A, B, C, D, E, F and G are cross-sections through a base layer printed with a plurality of initial layers of marking material.

All FIGS. 2A to 13J are diagrammatic and not-to-scale sequential cross-sections through the stages of the above method variants 1.1 to 6, respectively. FIGS. 14A and B are partial are cross-sections through a stressed skin suction deck and FIGS. 14C and D are plan views illustrating the use of a stressed skin suction deck in applying decals to a sheet of substrate material.

FIG. 1A shows a plurality of initial superimposed layers of marking material shown diagrammatically simplified as 10, applied to base layer 20.

Within all the variants of the method of the invention, initial superimposed layers of marking material 10 are applied in layers which may be described as "blocked out" or "solid", being applied in continuous layers with no attempt to produce the ultimately desired print pattern, typically referred to herein as initial layers. Portions of these layers are subsequently removed to ultimately form a substrate partially imaged with a print pattern of layers of marking material superimposed with substantially exact registration, the unimaged area(s) being where the portions of marking material have been previously removed. The initial superimposed layers can be of many different types of marking material, of any colour, and may be background layers, which extend over all of the eventual print pattern, or design layers which do not extend over all of the eventual print pattern.

Figure 1B:
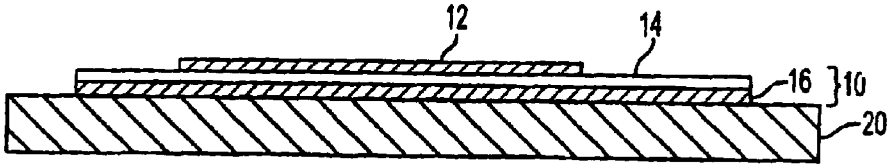

In FIG. 1B, layers 14 and 16 are background layers and layer 12 is a design layer. A design layer may comprise a single or "spot" colour layer or a plurality of spot colour layers or may be a multi-colour process layer, such as a four colour process layer (CMYK) typically comprising cyan, magenta, yellow and black inks, a five colour process, for example of cyan, magenta, yellow and black plus white, for example for some types of image on transparent substrates, or a hexachrome process.

Figure 1C:
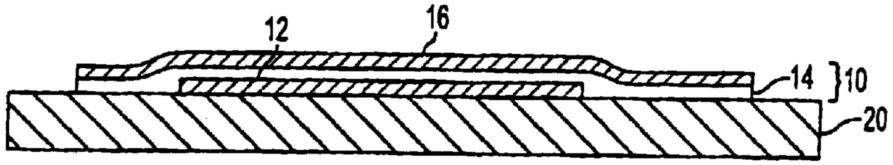

In FIG. 1C, the design layer 12 is first applied to the base layer 20 in reverse, and then background layers 14 and 16 are applied, for example if the design layer 12 is to be eventually seen through a transparent substrate or if base layer 20 is a direct transfer carrier, which requires reverse printing on the carrier for the design to be "right-reading" on the substrate to which it is transferred.

Figure 1D:
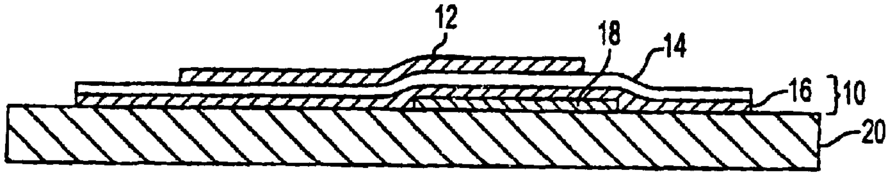
Figure 1E:
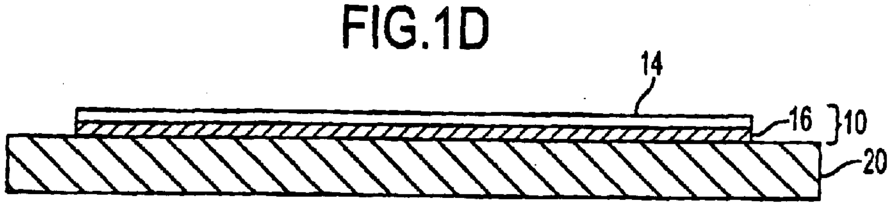
Figure 1F:
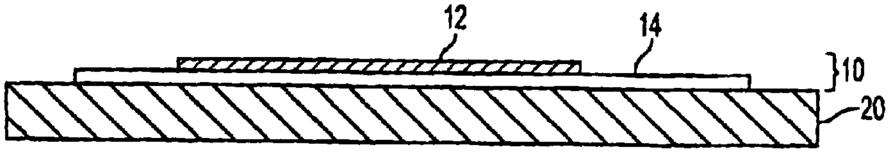
Figure 1G:
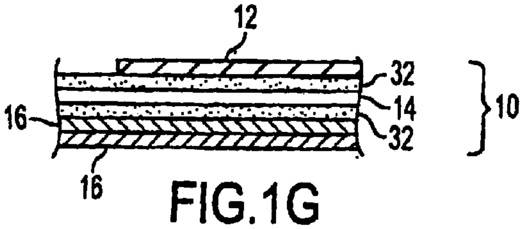

In FIG. 1D, there is a design layer on both sides of the background layers 14 and 16, design 12 visible from one side of the background layers and design 18 ultimately visible on the other side of the background layers. FIG. 1E shows just two initial superimposed layers 14 and 16, for example which could ultimately produce a simple vision control panel having one single colour but no design visible from one side and another single colour but no design visible from the other side. FIG. 1F shows a design layer 12 with a single background layer 14. FIG. 1G shows that initial superimposed layers 10 may contain multiple layers of the same material, for example two layers of background layer 16, for example if required to achieve sufficient opacity of marking material 16, and any number of transparent inter-layers 32 between any other layers of marking material, for example to protect migration of pigments from one marking material layer into another marking material layer.

It should be understood that FIGS. 1B–F show only a few of the possible combinations of initial superimposed layers of marking material. In the subsequent figures, it should be understood that the initial superimposed layers of marking material 10 may comprise any number of background layers of any type, in any order, and any number of design layers visible on either side or visibly concealed within other layers.

For simplicity, the method-variants which are illustrated in FIGS. 2–13 are typically illustrated only using initial superimposed layers of marking material 10. In some figures, two background layers and one design layer are shown, for example to illustrate one type of vision control panel product made with a glass substrate and ceramic ink marking material. It should be understood that the descriptions apply to other types of substrate and other types of ink or other marking material, to make any type of partially imaged product.

Figure 2A:
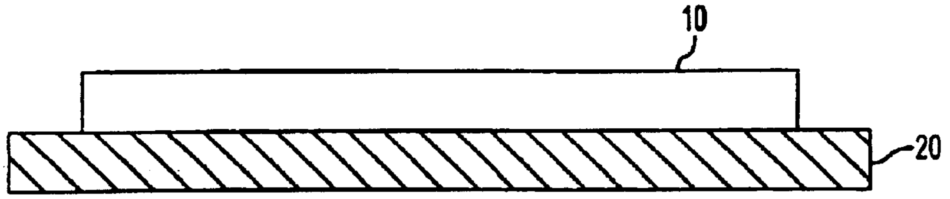
Figure 2B:
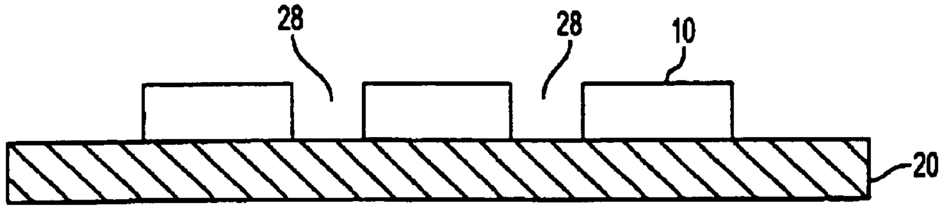
Figure 2C:
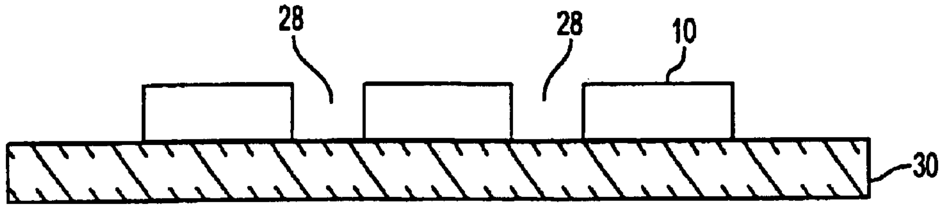
Figure 2D:
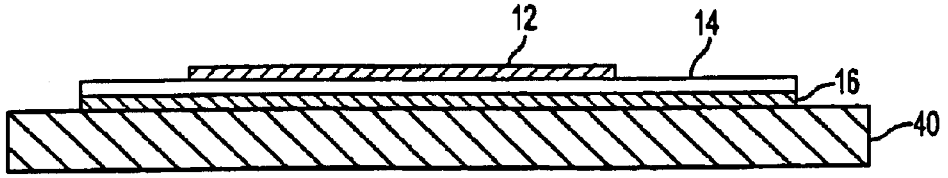
Figure 2E:
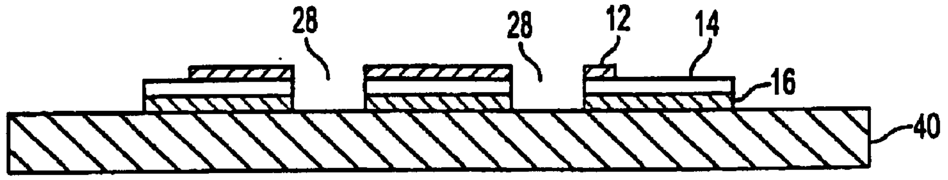
Figure 2F:
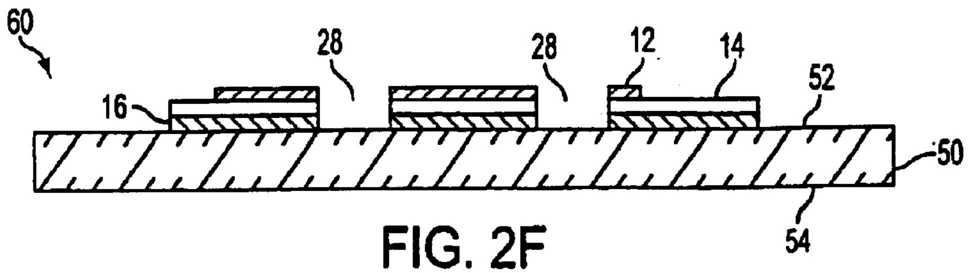

FIGS. 2A–F illustrates method 1.1 in which the base material 20 has initial superimposed layers of marking material 10 applied to it. FIG. 2B shows portions of marking material removed to leave unimaged portions 28. In FIG. 2C, base material 20 has undergone a information into substrate 30 with at least one substantially different material property to its previous state as base material 20. By way of a more detailed example, FIGS. 2D–F illustrate sequential stages corresponding to FIGS. 2A–C of making a vision control panel 60. FIG. 2D includes a sheet of glass 40 variously described as flat glass, float glass or annealed glass. A black ceramic ink background layer 16, a white ceramic ink background layer 14 and a ceramic ink design layer 12 are applied in continuous layers to glass sheet 40. FIG. 2E shows portions of the initial superimposed layers of ceramic ink removed to leave unimaged portions 28.

The removal of the unwanted ceramic ink can be by any method, for example an array of chisels which are fixed to a moving frame to enable lines of unwanted ink to be scraped away, leaving the desired print pattern of layers of ceramic ink superimposed with substantially exact registration. In FIG. 2F, the glass sheet 40 and ceramic ink layers 12, 14 and 16 have been subjected to a glass tempering thermal regime which has caused the glass to change into tempered or toughened glass sheet 50 wit a zone of pre-compression adjacent to each of its principal surfaces 52 and 54. the tempered glass sheet 50 having substantially higher flexural strength than annealed glass sheet 40. Also, the ceramic ink background layer 16 has been fused onto tempered glass sheet 50 and ceramic ink layers 12 and 14 have also fused to form a durable ceramic ink print pattern that will withstand considerable wear and tear, the resultant vision control panel 60 being suitable, for example, for a building window, partition or other architectural glass panel.

Figure 3A:
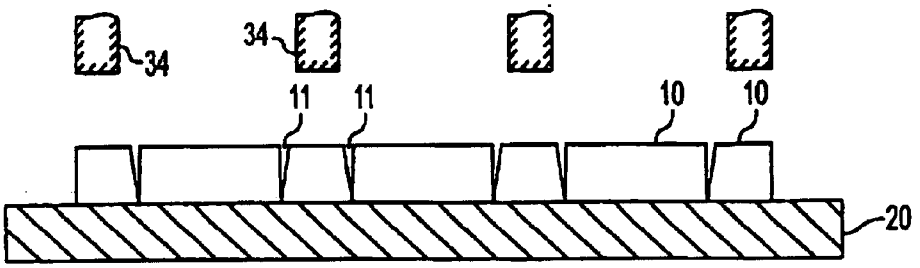
Figure 3B:
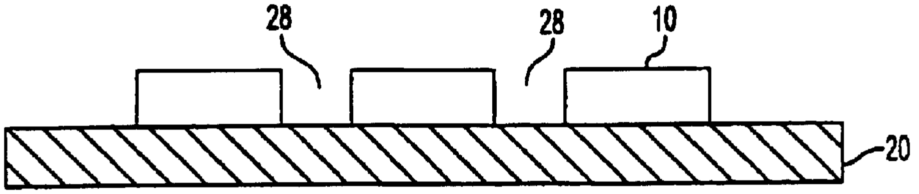
Figure 3C:
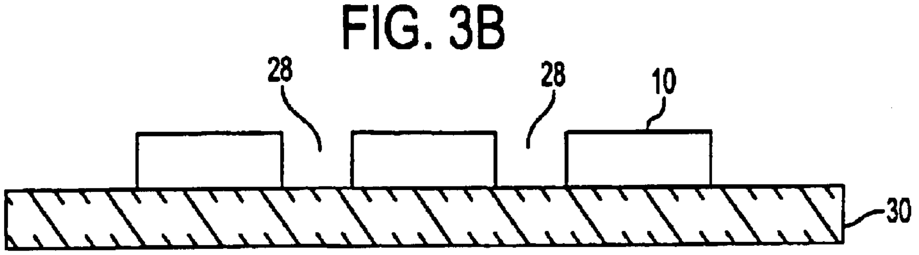
Figure 3D:
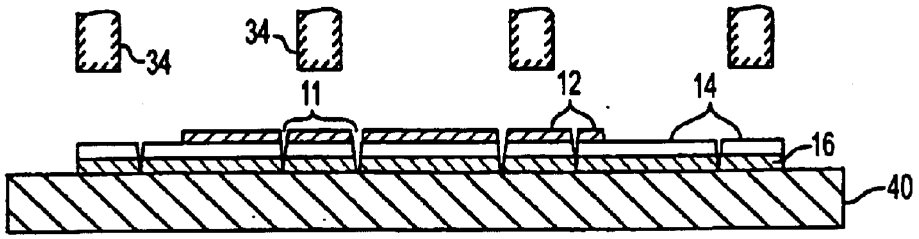
Figure 3E:
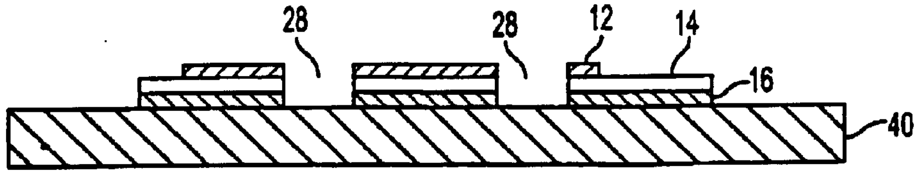
Figure 3F:
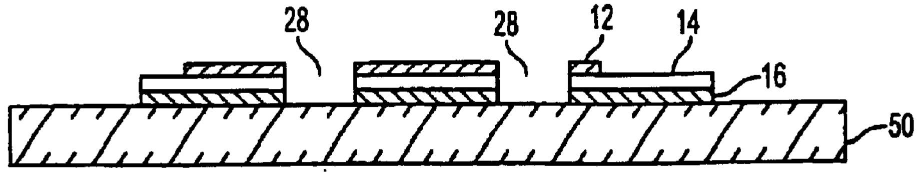

FIGS. 3A–D illustrate method 1.2 which is similar to method 1.1 but in which the initial superimposed layers of marking material 10 are pre-cut as illustrated in FIG. 3A with incisions 11, for example by means of an array of blades fixed to a moveable frame. The incisions assist the removal of unwanted ink, for example individual chisels or other scraping devices 34 can be narrower than the width of removed portions 28 in FIG. 3B, owing to the membrane tensile strength of the marking material layers 10. The residual marking material 10 and base layer 20 shown in FIG. 3B can then be processed as described for method 1.1, to leave substrate 30 having a substantially different material property to base layer 20, as shown in FIG. 3C. In the manufacture of a vision control panel FIG. 3D shows incisions 11 in ceramic ink layers 12, 14 and 16 assisting in the removal of unwanted ink to leave the desired print pattern layers of ceramic ink 12, 14 and 16 in substantially exact registration leaving unimaged areas 28 on glass sheet 40, as shown in FIG. 3E. The glass and ceramic ink can then be processed as described for method 1.1, to leave tempered glass 50 and fused ceramic ink layers 12,14 and 16 in FIG. 3F.

Figure 3G:
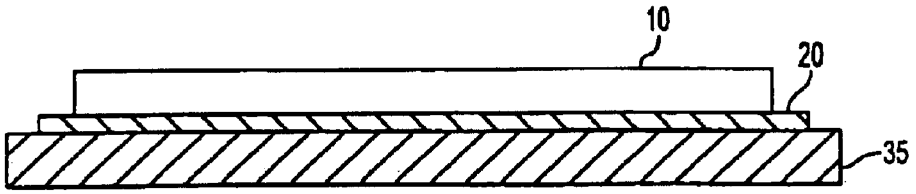
Figure 3H:
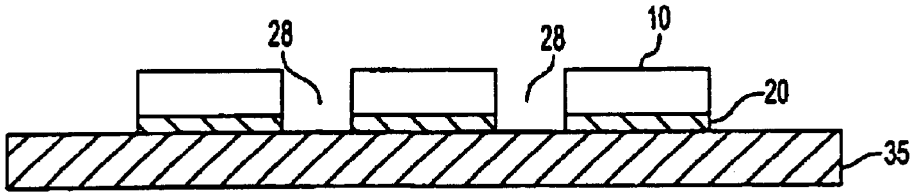
Figure 3I:
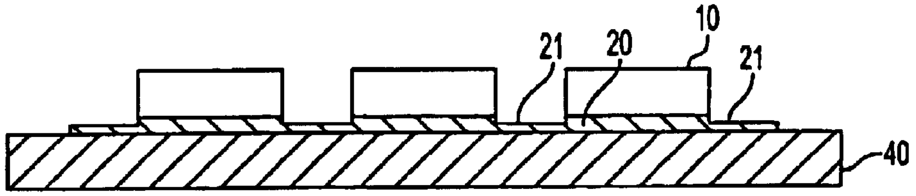
Figure 3J:
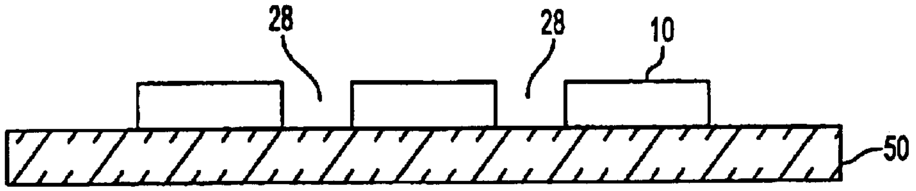

FIGS. 3G–J illustrate method 13 in which a base layer 20 is first applied to substrate 35 before the application of the initial superimposed layers of marking material 10, as illustrated in FIG. 3G. The unwanted marking material is removed by one of the methods included in method 1.1, to produce the layers of marking material and base layer in the required print pattern superimposed in substantially exact registration, leaving unimaged areas 28, as shown in FIG. 3H. In the manufacture of certain products, for example a vision control panel, the base layer 20 is advantageously a frangible clear material which does not need to be completely removed from glass substrate 40, as illustrated in FIG. 3I. When the glass sheet 40 is subject to a glass tempering regime, this base layer 20 is burnt off, leaving the layers of ceramic ink 10 in the form of the desired print pattern superimposed in substantially exact registration with unimaged areas 28 on a tempered glass sheet, as illustrated in FIG. 3J. The tempered glass sheet 50 has substantially different material properties to glass sheet 40, including greatly increased flexural strength.

Figure 3K:
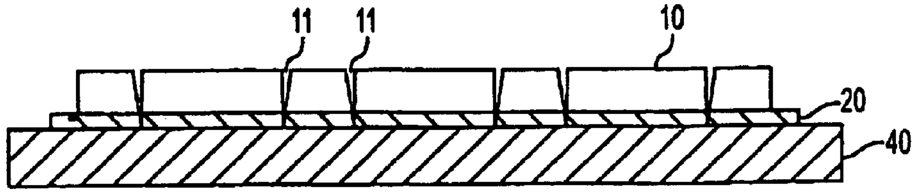
Figure 3L:
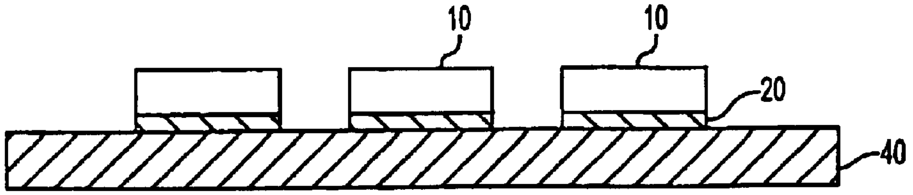

FIG. 3K illustrates method 1.4, which is similar to method 1.3, except that the layers of marking material 10 and preferably the base layer 20 are pre-cut with incisions 11 to assist the removal of the unwanted ink from the substrate 30. FIG. 3L shows the unwanted ink removed. In the tempering process, the base layer 20 is burnt off, leaving the vision control panel as in FIG. 3J.

FIGS. 4 A–F illustrate methods 1.5 and 1.6 using direct transfers. In FIG. 4A, illustrating the manufacture of a vision control panel, the base layer 23 is a direct ceramic ink heat release decal carrier 23 comprising a sealed paper, a heat release layer such as a wax, to which may be added an optional covercoat 36, preferably non-film-forming, onto which initial superimposed layers of ceramic ink 10 are applied, followed by heat-activated adhesive layer 22. FIG. 4B illustrates the unwanted ceramic ink and adhesive removed by a mechanical means, for example one of those described in method 1.1. According to method 1.6, the ink removal is assisted by pre-cut incisions 11, as shown in FIG. 4C. It has been found that pre-cutting the adhesive layer, the ceramic ink layers and the optional covercoat layer 36 enables the clean removal of unwanted ink, for example using an array of chisels which may be of less width than the width of the unimaged areas 28, as the membrane tensile strength of the ink and the supporting "raft" effect of covercoat 36 ensures the ink is removed cleanly up to the pre-cut edges, as illustrated in FIG. 4B. FIG. 4D shows the decal directly applied to a glass sheet 40, for example by heated rollers or a heated platten. The heat release layer is activated, together with the heat activated adhesive, enabling the removal of the decal carrier. FIG. 4E shows the decal carrier removed, leaving the print pattern of superimposed layers of ceramic ink in substantially exact registration, with unimaged areas 28.

Figure 4A:
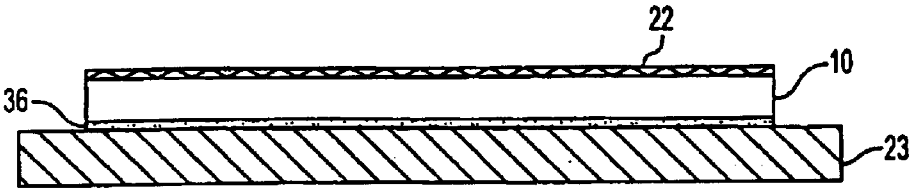
Figure 4B:
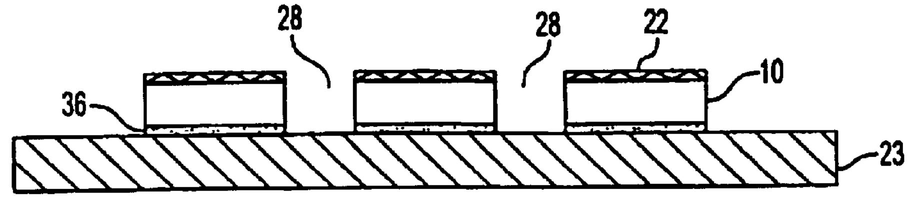
Figure 4C:
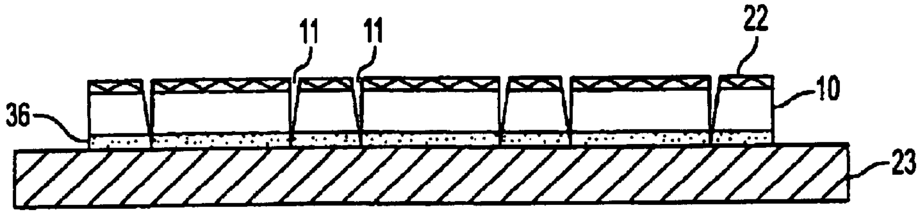
Figure 4D:
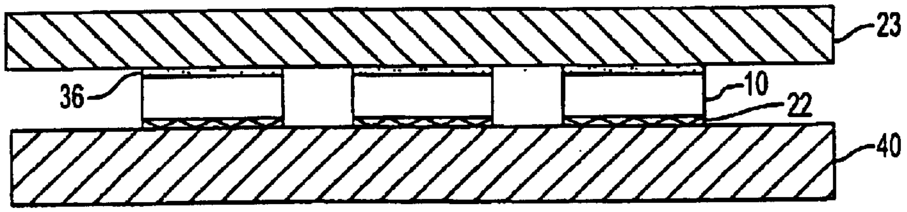
Figure 4E:
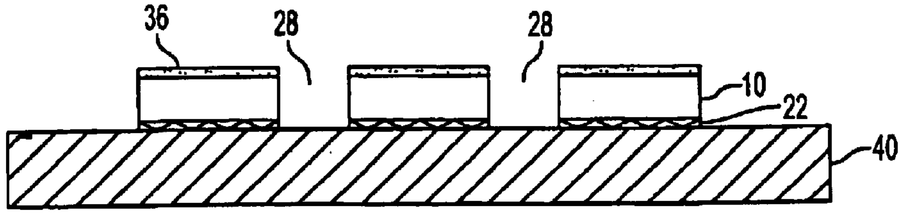
Figure 4F:
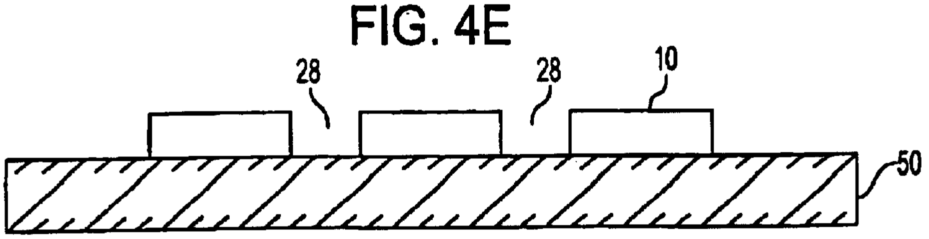

The layers of ceramic ink and adhesive transferred onto glass substrate sheet 40 are subjected to an ink fusing or a glass tempering regime, in which the ceramic ink is fired onto the glass 50, as shown in FIG. 4F.

Figure 5A:
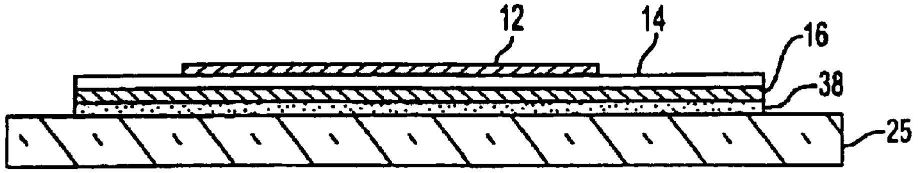
Figure 5B:
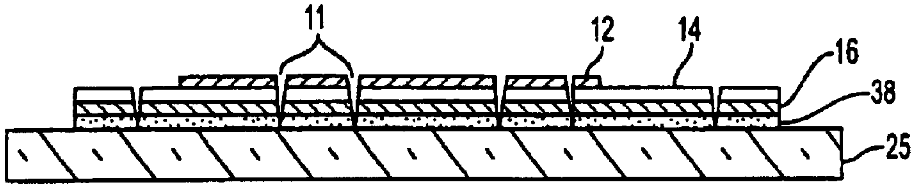
Figure 5C:
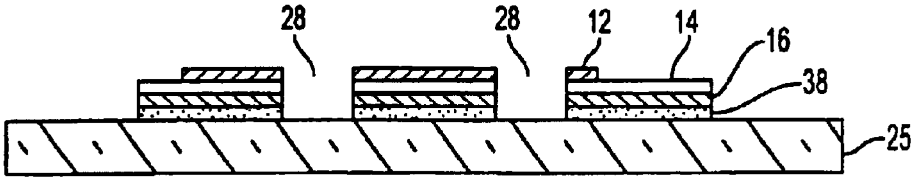
Figure 5D:
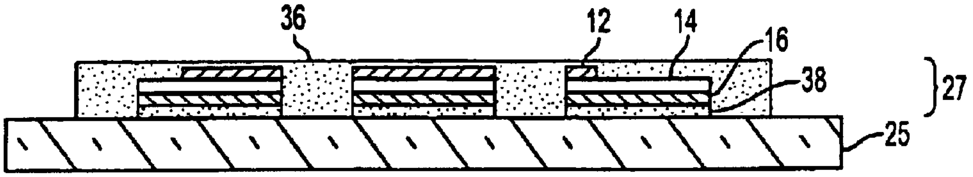
Figure 5E:
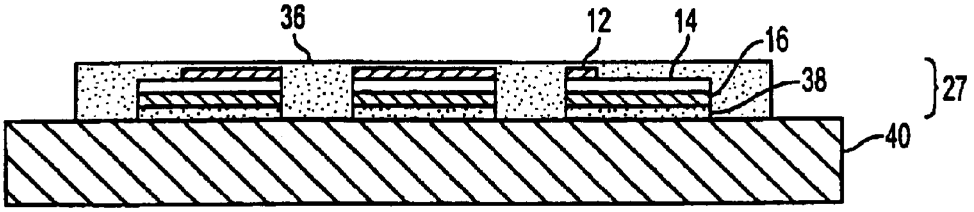
Figure 5F:
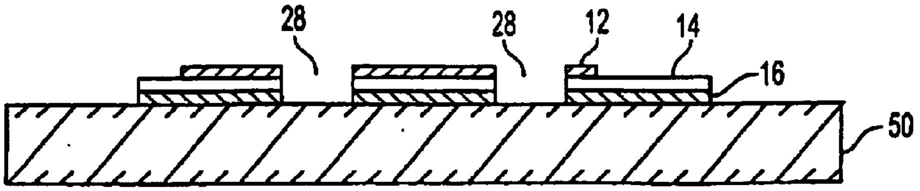

FIGS. 5A–F illustrate methods 1.5 and 1.6 using indirect waterside decal carrier 25 in FIG. 5A with optional downcoat 38, and initial superimposed ceramic ink layers 12, 14 and 16. FIG. 5C shows the unwanted ink removed by mechanical means to leave the unimaged areas 28. Optionally, the decal layers are pre-cut according to method 1.6, as illustrated in FIG. 5B with incisions 11, to assist removal of the unwanted ink. In FIG. 5D a covercoat 36 is applied, typically a methacrylate lacquer to complete decal 27. FIG. 5E shows the decal 27 transferred to glass sheet 40 after wetting the transfer assembly of FIG. 5D and removing the decal carrier 25. In FIG. 5F, the decal 27 and glass sheet 40 have been subjected to a glass tempering regime, burning off downcoat 38 and covercoat 36, leaving ceramic ink layers 12, 14 and 16 fused into tempered glass 50 in the required print pattern in substantially exact registration.

Figure 6A:
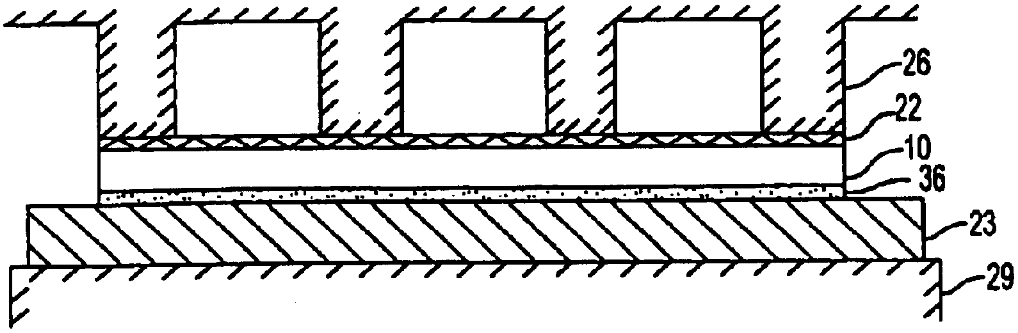
Figure 6B:
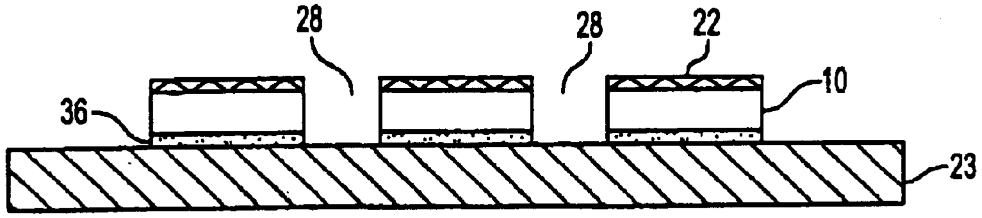
Figure 6C:
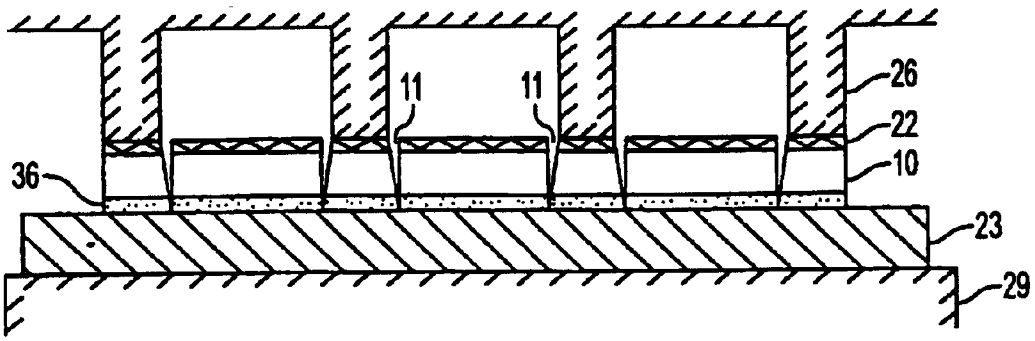

FIGS. 6A to 7D illustrate methods 2.1 to 2.5, in which unwanted marking material is removed by means of a heated profiled roller. In FIGS. 6A–C illustrating methods 2.1 and 2.2, direct decal carrier 23 has a heat release layer, is optionally provided with a covercoat 36, preferably non-film-forming, and is printed with initial superimposed marking material layers 10 and heat-activated adhesive 22. This transfer assembly is passed between rollers 26 and 29, roller 26 being a heated profiled roller with projections, typically cylindrical projections to create a print pattern of lines. Roller 29 has a conventional, smooth surface. Heated profiled roller 26 activates the adhesive 22 and heat release layer, thus removing the unwanted making material to leave unimaged areas 28 and a decal in the required print pattern, as illustrated in FIG. 6B. According to method 2.2, as shown in FIG. 6C, the initial superimposed layers are first pre-cut with incisions 11 to assist removal of unwanted marking material, in which case the width of the projecting cylindrical elements of heated roller 26 can be less than the width of marking material removed in FIG. 6B. In the manufacture of a tempered glass vision control panel, the decal is then transferred to a sheet of glass 40 as previously shown in FIG. 4D and the process is completed as previously described according to FIGS. 4E and 4F, to leave fused ceramic ink layers 10 in the required print pattern with substantially exact registration on tempered glass 50.

Figure 7A:
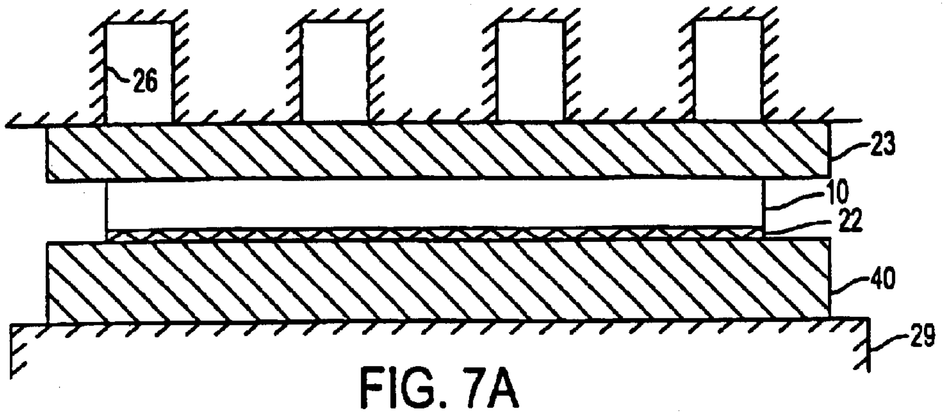
Figure 7B:
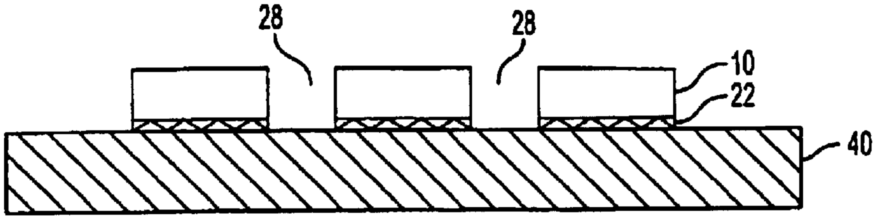
Figure 7C:
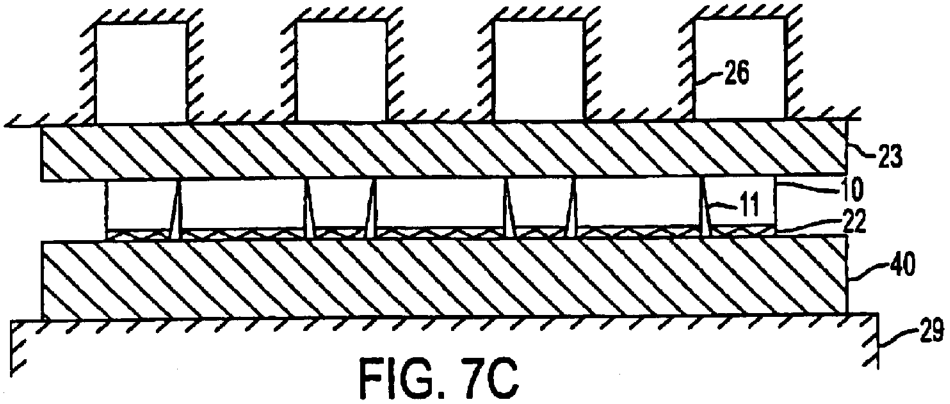
Figure 7D:
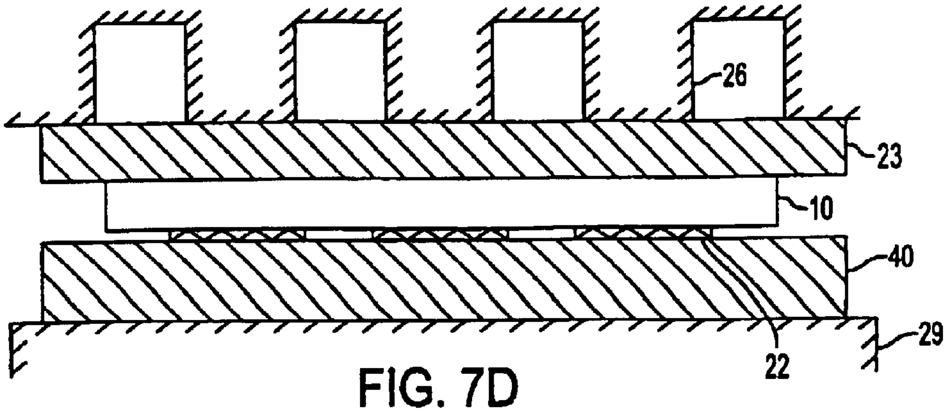

FIGS. 7A–D illustrates methods 2.3, 2.4 and 2.5, in which a heated profiled roller is used to selectively transfer the desired print pattern of marking material onto a substrate from a direct transfer decal carrier. FIG. 7A illustrates method 2.3, which is a conventional direct ceramic ink heat release transfer process except that heated roller 26 is profiled to the desired print pattern. Passing between heated profiled roller 26 and plain roller 29 is a direct ceramic ink decal carrier 23, with a heat-release layer 2, initial superimposed layers of ceramic ink 10 and heat-activated adhesive 22. This direct transfer assembly is pressed together with glass sheet 40, whereupon the heat release layer 2 and adhesive 22 are selectively activated across the area of the print pattern by the heated profiled roller 26. An ink fracture mechanism enables the print pattern to be deposited by the selectively activated adhesive force, while the unwanted ink is selectively pulled away from the glass sheet by the decal carrier where the heat release agent is not activated. As shown in FIG. 7B, the desired print pattern of superimposed layers of ceramic ink 10 and adhesive 22 are left in substantially exact registration, leaving unimaged portions 28. FIG. 7C illustrates method 2.4, which is similar to 2.3, except that the edges of the print pattern are defined by precut incisions 11. This allows the heated profiled roller surface to be of less width than the areas 28 to be unimaged in the resultant arrangement of FIG. 7B, allowing a practical tolerance in the "set up" of a pre-cutting and transfer production line. FIG. 7D illustrates method 2.5, which is similar to method 2.3 except that the heat-activated adhesive layer 22 is selectively applied to the initial superimposed layers of ceramic ink 10, to accurately define the desired print pattern in the resultant arrangement of FIG. 7B. In each of methods 2.3, 2.4 and 2.5, the transferred ceramic ink layers 10, adhesive 22 and glass sheet 40 are subject to a glass tempering regime, which burns off the adhesive 22, resulting in an arrangement such as FIG. 4F, with the ceramic ink layers 10 fused onto a sheet of tempered glass 50.

Figure 8A:
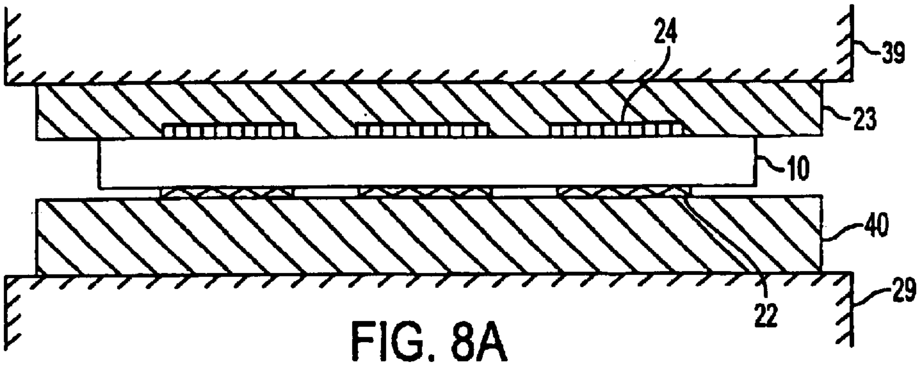
Figure 8B:
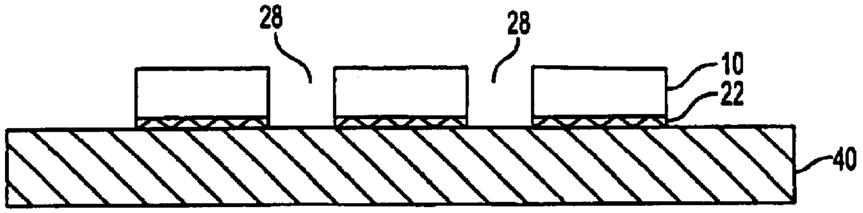
Figure 8C:
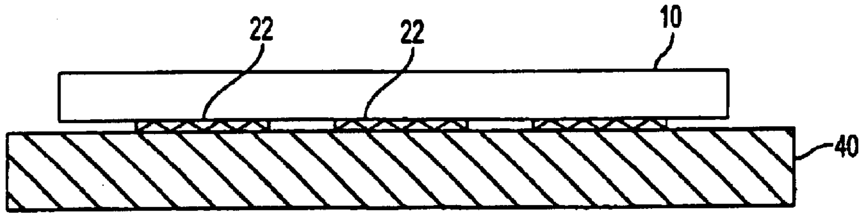

FIGS. 8A and B illustrate method 3.1 of effecting the direct transfer of the print pattern only from a direct transfer assembly. For the manufacture of a vision control panel, in FIG. 8A, direct ceramic ink decal carrier 23 with a selectively applied heat-release layer 24, initial superimposed ceramic ink layers 10 and selectively applied heat-activated adhesive 22 are passed between heated roller 39 and roller 29 with glass sheet 40. This activates heat release layer 24 and adhesive 22, both in the form of the desired print pattern. An ink fracture mechanism along the edges of the print pattern facilitates the transfer of the layers of ceramic ink 10 and adhesive 22 in the form of the print pattern superimposed with substantially exact registration on glass sheet 40 leaving unimaged areas 28, according to FIG. 8B. The imaged glass may then be subject to a tempering regime resulting in the arrangement of FIG. 4F, in which ceramic ink layers 10 are fused onto the tempered glass 50 in the desired print pattern in substantially exact registration. FIG. 8C illustrates method 3.2 in which only the heat-activated adhesive 22 is selectively applied in the form of the print pattern. On passing through heated rollers, the whole of the initial superimposed ceramic ink layers 10 are therefore transferred onto glass sheet 40. The unwanted ink is then removed, for example by air jetting, to leave the print pattern adhered by the selectively applied adhesive, the unwanted ceramic ink having been removed from the unimaged areas 28 as shown in FIG. 5B.

Figure 8D:
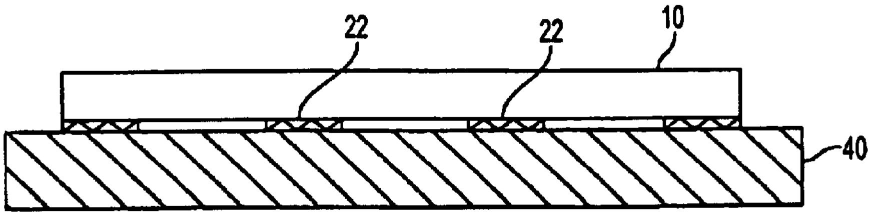
Figure 8E:
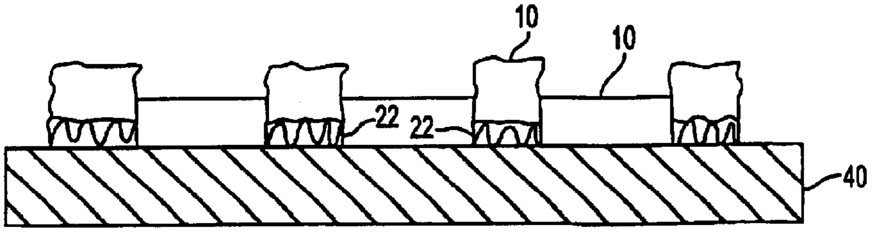

FIG. 8D illustrates method 3.3 which is similar to 3.2 except that the heat-activated adhesive is selectively applied in the form of a stencil to the desired print pattern. The stencil and the unwanted ink above are then removed, for example by the adhesive containing microspheres of blowing agent. When the glass and applied ink and adhesive are subjected to a heating regime, in which the desired print pattern is baked or fused to the sheet of glass, the expanding adhesive stencil "bursts off" the unwanted ink as illustrated in FIG. 8E. The removed ink and stencil are then disposed of and a glass tempering regime leaves the desired arrangement of FIG. 4F, in which ceramic ink layers 10 are fused onto tempered glass 50. While methods 3.2 and 3.3 primarily are intended for the use of direct transfers, an indirect transfer system can use the same methods if the functions of transfer release and adhesive are separated, for example the adhesive system being heat-activated whereas the release mechanism is water-activated.

Figure 9A:
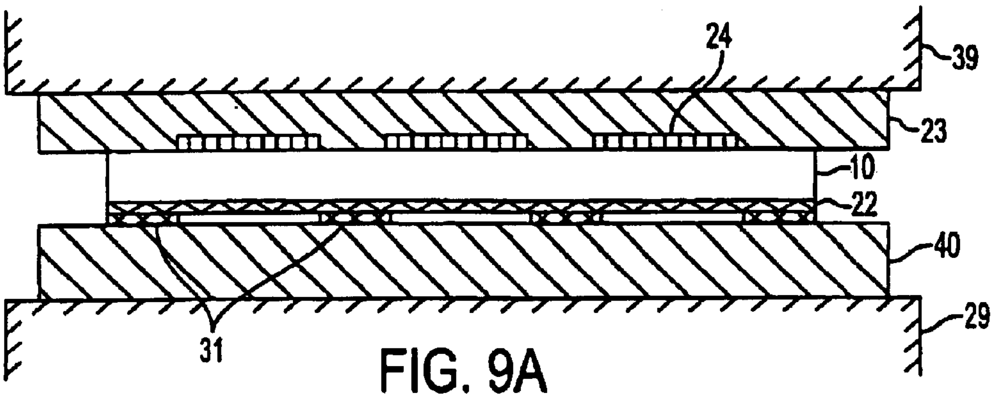
Figure 9B:
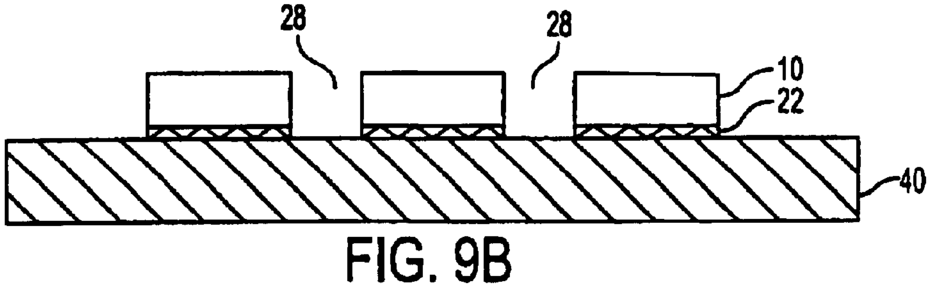

FIGS. 9A and B illustrate method 4.1 utilising a direct transfer decal 23 but with a selectively applied heat release layer 24 in the form of the required silhouette pattern. To this is applied initial superimposed marking material layers 10, continuous heat-activated adhesive 22 and a stencil of the desired print pattern 31. This direct transfer assembly is applied to a substrate by means of heated roller 39 and roller 29, whereupon only the print pattern and adhesive outside the stencil is transferred to the substrate. In the manufacture of a vision control panel ceramic ink layers 10 are applied in the required print pattern to glass sheet 40 by adhesive 22, which is selectively blocked from the glass sheet 40 by the stencil 31. FIG. 9B shows the required silhouette pattern transferred onto glass sheet 40, which may then be subjected to a glass tempering regime, to result m the arrangement of FIG. 4F with ceramic ink layers 10 in the form of the required print pattern superimposed with substantially exact registration and fused onto tempered glass 50.

Figure 9C:
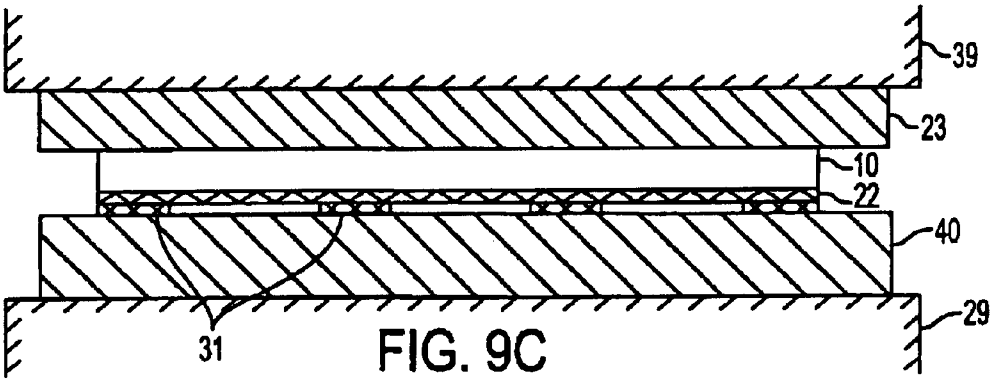
Figure 9D:
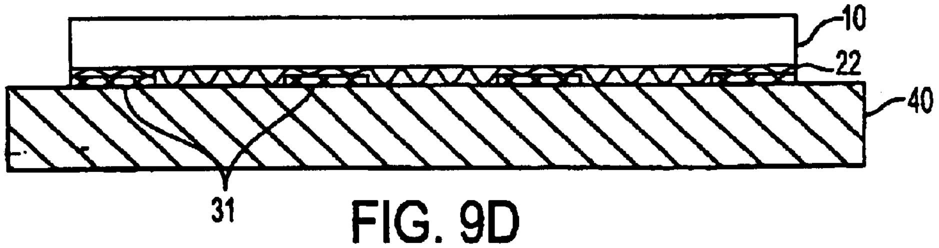
Figure 9E:
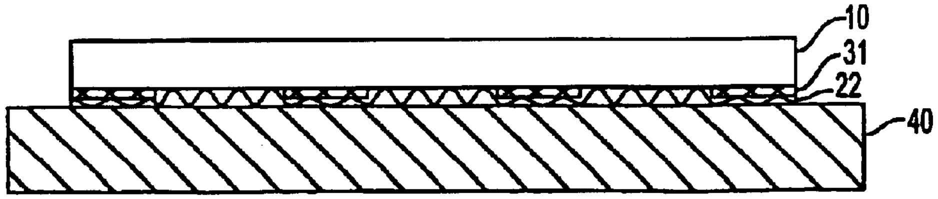

FIGS. 9C and D illustrate method 42, which is similar to method 4.1 except that the heat-release layer 24 is continuous, therefore effecting the complete transfer of initial superimposed layers 10, as illustrated in FIG. 9D. The stencil 31 and unwanted adhesive and ink above it are then removed, for example by virtue of stencil 31 being heat expandable. The removal of unwanted material is completed, for example by vacuum suction, leaving the arrangement of FIG. 9B, which may optionally be converted into the toughened glass vision control panel of FIG. 4F, as previously described FIG. 9E illustrates method 4.3, which is similar to 4.2, except that the heat expandable stencil layer 31 is intermediate the initial superimposed layers of ceramic ink 10 and the heat-activated adhesive 22. The unwanted ink is then removed as in method 4.2. With this method it is important that any residual stencil material adhered to the adhesive 22 is also burnt off in the process of glass tempering.

Figure 10A:
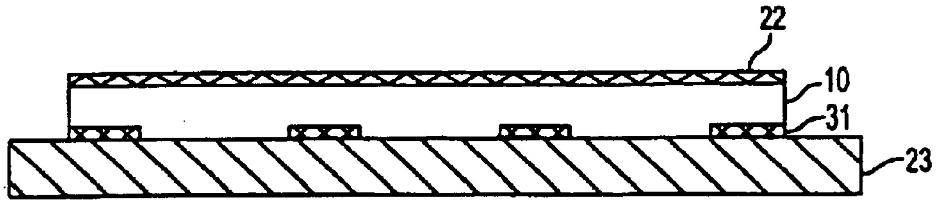
Figure 10B:
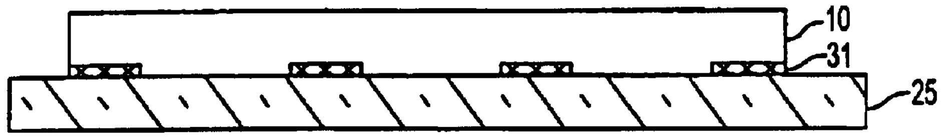
Figure 10C:
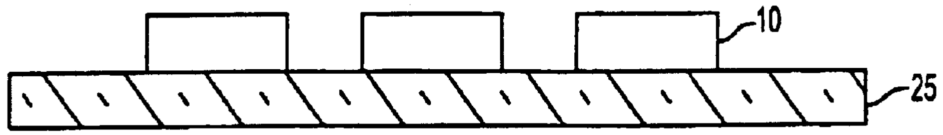
Figure 10D:
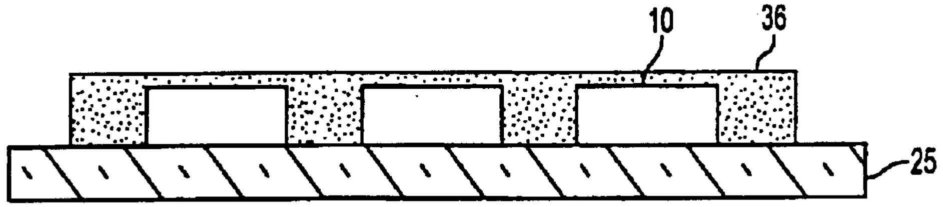
Figure 10E:
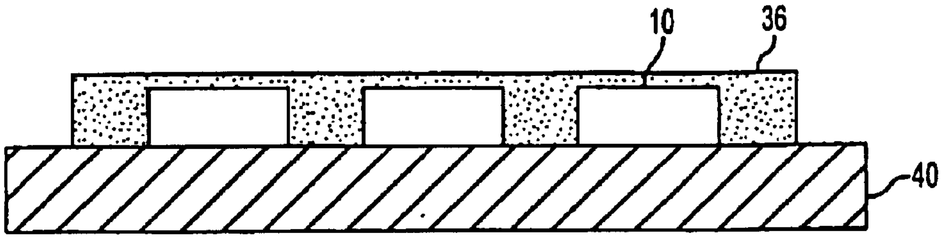

FIGS. 10A–E illustrate method 5.1. In FIG. 10A, direct transfer carrier 23 supports a stencil of the required print pattern 31, initial superimposed layers of marking material 10 and heat-activated adhesive 22. The stencil 31, ceramic ink 10 and adhesive 22 immediately above the stencil is removed by one of the methods previously described to leave the arrangement of FIG. 6B with similar processing thereafter. FIGS. 10B–E also illustrate method 5.1, in which indirect decal carrier 25 supports stencil 31 and marking material layers 10. The stencil and marking material above it are removed, as illustrated in FIG. 10C and covercoat 36 is applied as illustrated in FIG. 10D. In the manufacture of a vision control panel, ceramic ink 10 and covercoat 36 are released by the application of water and are transferred from waterslide carrier 25 to glass sheet 40, as illustrated in FIG. 10E. This arrangement is then subjected to an ink fusing or a glass tempering process, the covercoat 36 is burnt off, leaving ceramic ink layers 10 in the form of the desired print pattern, optionally on tempered glass 50, as illustrated in FIG. 4F.

Figure 11A:
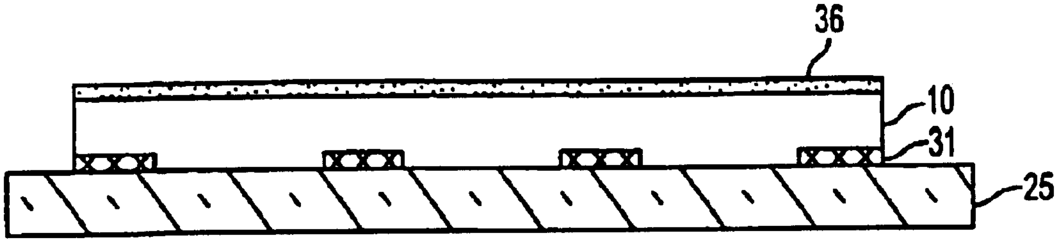
Figure 11B:
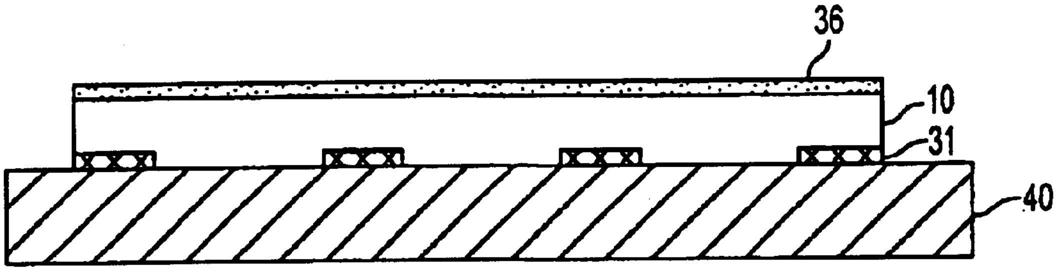
Figure 11C:
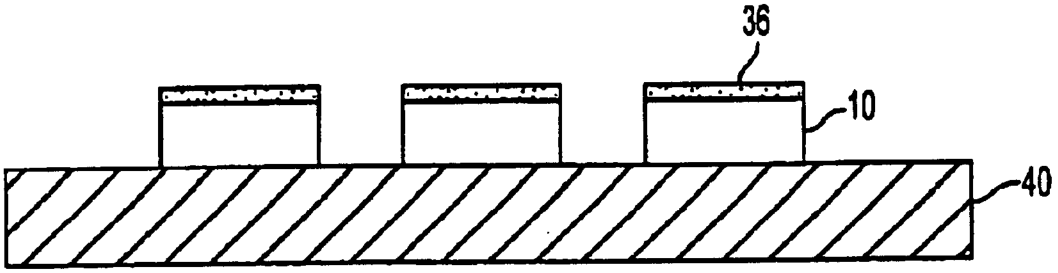
Figure 11D:
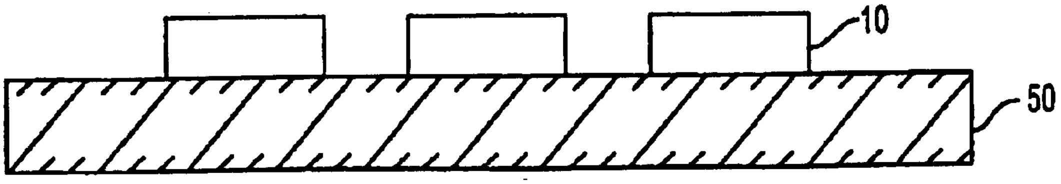

FIGS. 11A–D illustrate method 5.2 using an indirect transfer. In FIG. 11A, indirect waterside decal carrier 25 supports stencil 31 of the desired print pattern, initial superimposed layers of ceramic ink 10 and covercoat 36. In FIG. 11B, this decal is transferred to glass sheet 40, followed by the removal of stencil 31 and the unwanted ink and covercoat above it, by one of the methods previously described, leaving the arrangement of FIG. 11C. This may be subject to a glass tempering regime, resulting in layers of ceramic ink in the form of the desired print pattern superimposed with substantially exact registration fused onto tempered glass 50, as illustrated in FIG. 11D.

Figure 12A:
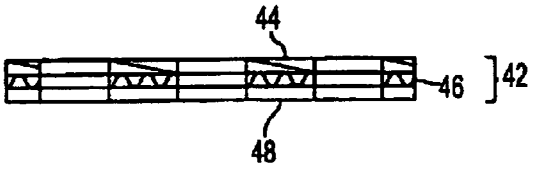
Figure 12B:
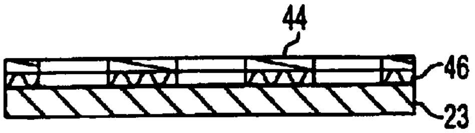
Figure 12C:
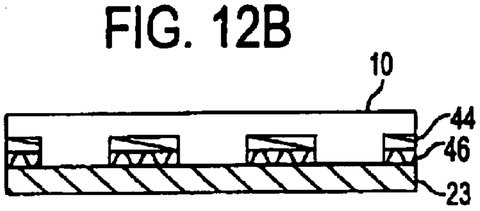
Figure 12D:
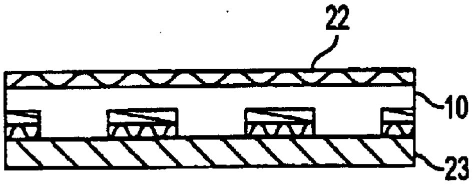
Figure 12H:
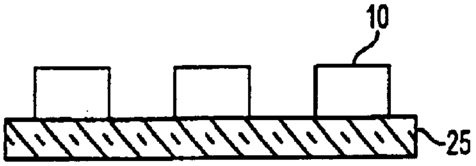
Figure 12E:
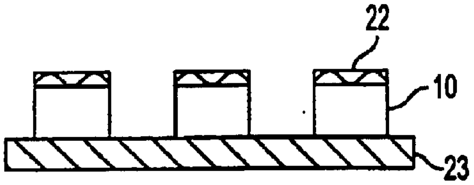
Figure 12J:
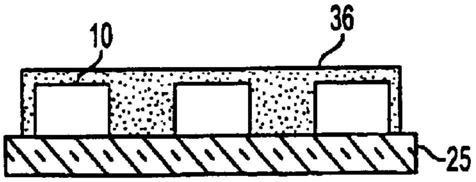
Figure 12F:
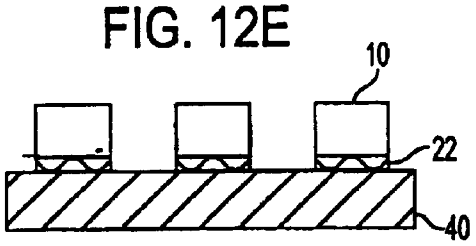
Figure 12K:
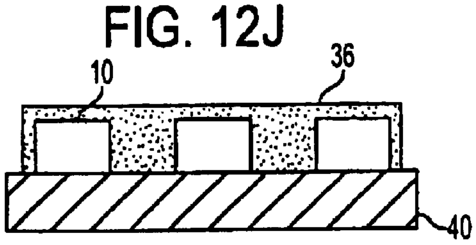
Figure 12G:
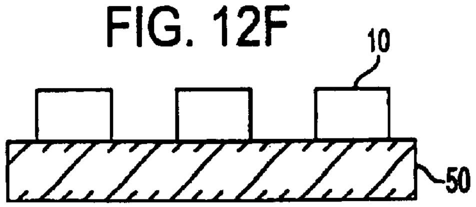

FIGS. 12A–K illustrate two variants of method 5.1, utilising a perforated self-adhesive vinyl material to form the stencil. FIG. 12A is a cross-section through a perforated self-adhesive vinyl 42, comprising a perforated facestock 44, perforated adhesive 46 and perforated liner 48, which is removed to enable the application of the facestock 44 and adhesive 46 to a conventional direct transfer decal carrier 23, as illustrated in FIG. 12B. In FIG. 12C initial superimposed layers of ceramic ink 10 are applied over the perforated self-adhesive vinyl stencil followed by conventional coating of heat-activated adhesive 22, as illustrated in FIG. 12D. In FIG. 12E the self-adhesive vinyl has been peeled away from the decal carrier 23 along with the ink and adhesive above it, leaving the ceramic ink layers 10 and adhesive 22 in the form of the desired print pattern on the decal carrier 23. The decal is conventionally transferred to a sheet of glass 40, as illustrated in FIG. 12F which may be subjected to a glass tempering regime resulting in the arrangement of FIG. 12G with the layers of ceramic ink fused in the form of the desired print pattern onto tempered glass 50. In the case of an indirect water slide ceramic ink transfer, this would be processed similarly to a direct transfer as illustrated in FIGS. 12A, B and C. The perforated self-adhesive vinyl and ceramic to ink above it is removed at this stage, to leave the arrangement of FIG. 12H, being the layers of ceramic ink in the desired print pattern superimposed on indirect waterslide decal carrier 25. In FIG. 12J, covercoat 36 is applied. This transfer assembly is then wetted, enabling the transfer of the decal onto glass sheet 40, as illustrated in FIG. 12K. When this arrangement is subject to a glass tempering regime, covercoat 36 is burnt off, resulting in the arrangement of FIG. 12G.

Figure 13A:
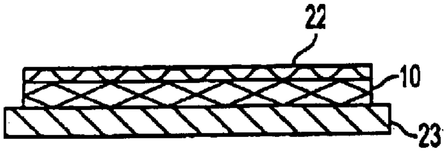
Figure 13B:
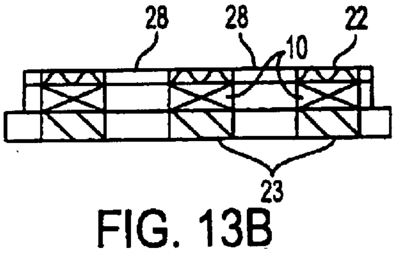
Figure 13C:
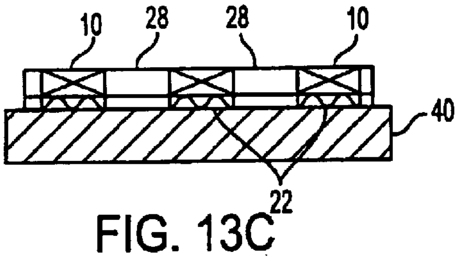
Figure 13D:
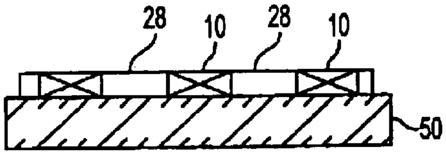
Figure 13E:
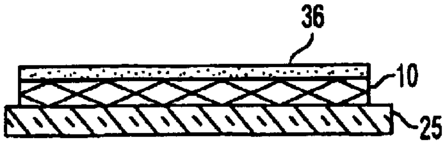
Figure 13F:
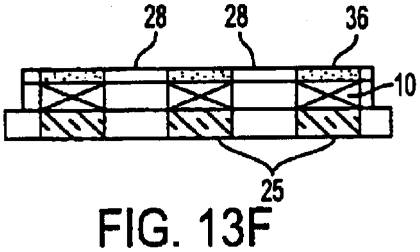
Figure 13G:
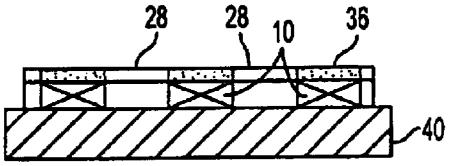

FIGS. 13A–J illustrate method 6 of improvements to the prior art method of using a perforated decal carrier. In the prior art, as illustrated in FIG. 13A, direct decal carrier 23 has applied to it initial superimposed layers of marking material 10 and heat-activated adhesive 22. In FIG. 13B, all these layers are perforated with holes 28. The decal is transferred conventionally onto a substrate, for example when using a direct ceramic ink decal to make a vision control panel, it is transferred onto glass sheet 40, as shown in FIG. 13C. Following a glass tempering regime, the adhesive 22 is burnt off and the perforated ceramic ink layers 10 are fused onto tempered glass 50 in the desired print pattern with unimaged areas 29 as illustrated in FIG. 13D. When using an indirect waterslide transfer as in FIG. 13E, the marking material 10 has covercoat 36 applied to it. FIG. 13F shows this assembly perforated with holes 28. The waterslide transfer is wetted and the decal applied to glass sheet 40, as illustrated in FIG. 13G. A glass tempering regime results in the arrangement of FIG. 13D, as previously described.

Figure 13H:
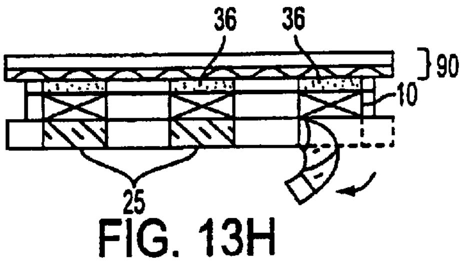
Figure 13J:
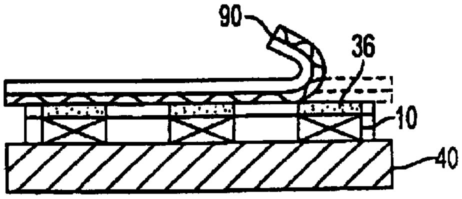
Figure 14A:
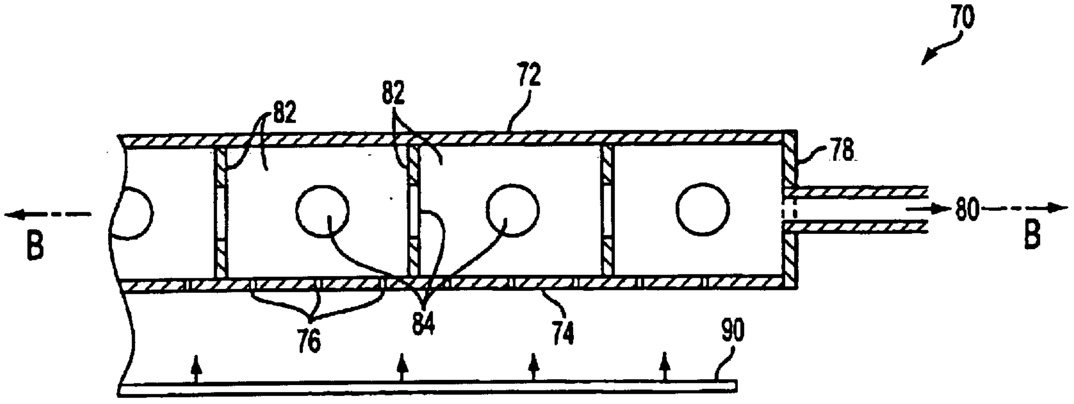
Figure 14B:
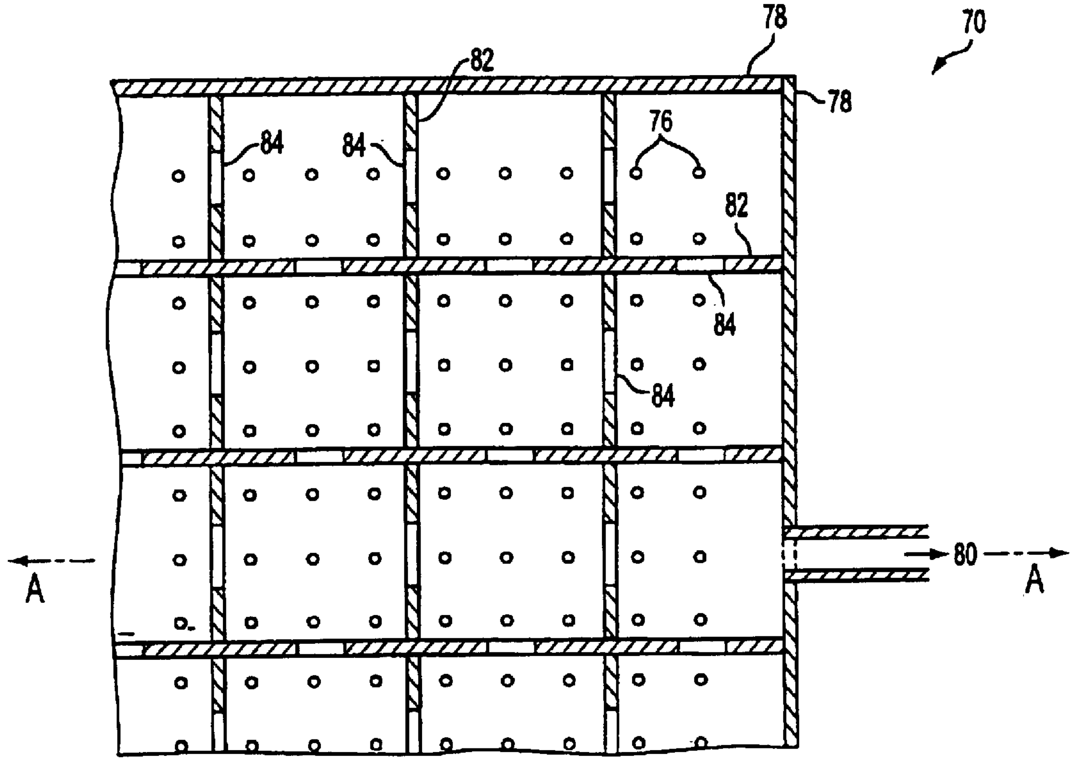

FIGS. 13H and J illustrate an improvement to the particular means of transferring an indirect transfer decal, which is particularly advantageous in the case of a perforated decal or large imperforate decal. It relies on the principle that an adhesive is relatively weak in peel strength compared to its adhesive strength perpendicular to its plane. In FIG. 13H, a layer of self-adhesive film or otherwise adhering layer 90 is applied over the perforated decal 10 with optional perforated covercoat 36. After wetting, heat or other normal means of releasing the decal carrier this is peeled away from the decal and covering layer 90, which may be held by a suction deck as described herein or other means of applying a restraining force perpendicular to the applied film and its means of adhesion. The decal is then applied to the substrate and the covering layer 90 is peeled from the substrate and decal as shown in FIG. 13J. The means of transfer illustrated in FIGS. 13H and J can advantageously be applied to an imperforate decal as a means of maintaining the dimensional stability of the decal during transfer.

FIGS. 14A and B are partial cross-sections through stressed skin Suction Deck 70, comprising upper skin 72, lower skin 74 with perforations 76, edge plate 78, internal cellular web members 82 with holes of any shape 84 connecting each zone of the air plenum within the upper and lower skins 72 and 74 and perimeter edge plates 78. Suction pump 80 sucks air from the plenum and thereby air into the plenum through perforations 76, which enables payload 90, for example a decal or a sheet of film material, to be lifted against the lower skin.

Figure 14C:
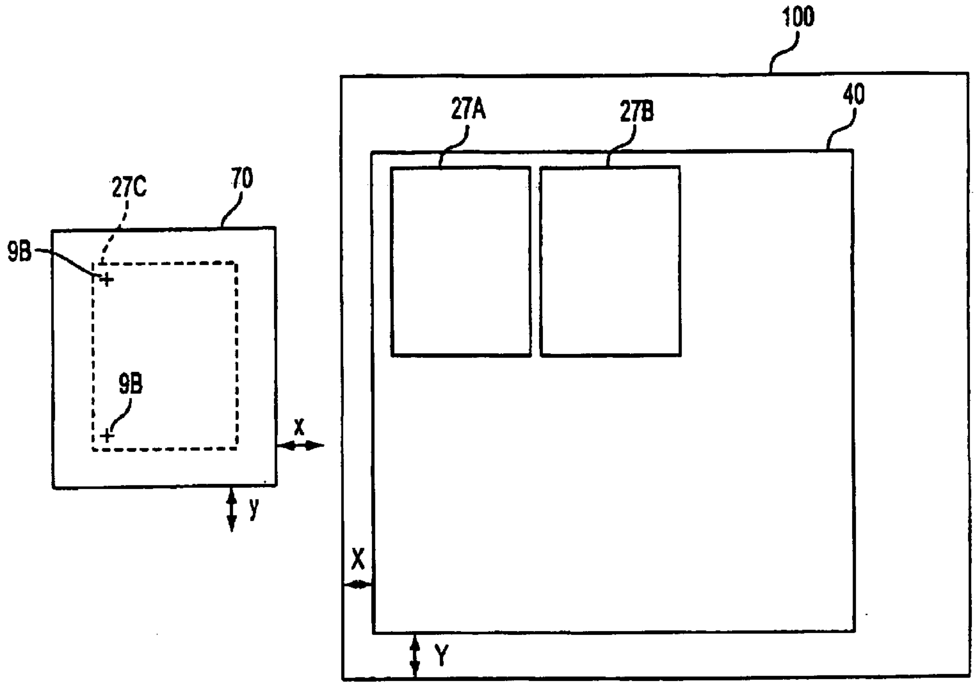

FIG. 14C illustrates suction deck 70 supporting decal 27C underneath with the suction deck lower skin typically sealed outside the area of the decal 27C by means of self-adhesive tape or computer controlled mechanical sealing of this perimeter area by closure of suction holes 76 or the holes 84 between cells of the suction deck. The suction deck is supported by a robotic arm or x-y-z positioning framework.

Glass handling bed 100 enables the accurate X-Y positioning of glass sheet 40 by means of a roller bed controlled by computer software. If the decal is an indirect waterslide ceramic ink decal, it is pre-wetted either before or after being picked up by the suction deck and the decal carrier removed. Registration devices 98 can be read for example by an optical reading device which enables x-y and vertical positioned control by computer to position decal 27C over its intended position in a tiling arrangement of decals 27A, 27B and 27C on glass sheet 40.

The decal is then automatically lowered to the upper sure of the glass. Positive pressure is then applied to the decal, or to decal carrier in the case of a direct transfer. In the former case, gentle squeegeeing of the decal to remove water under the decal may be required. In the latter case, hot air may optionally be introduced into the suction deck, or the suction deck may be heated for example by conductive heating of an aluminium suction deck.

Figure 14D:
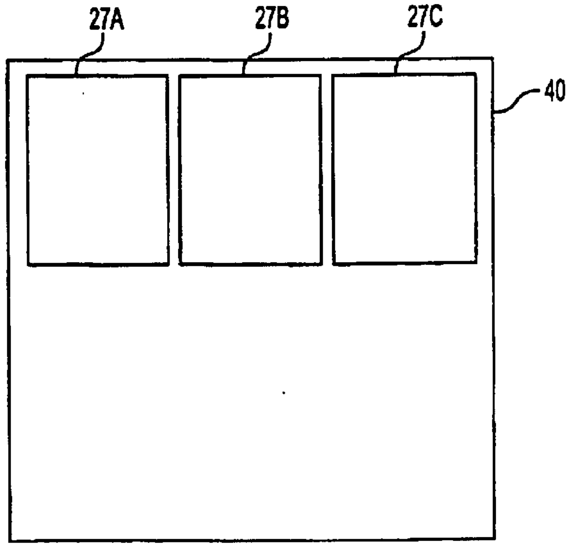
Figure 15:
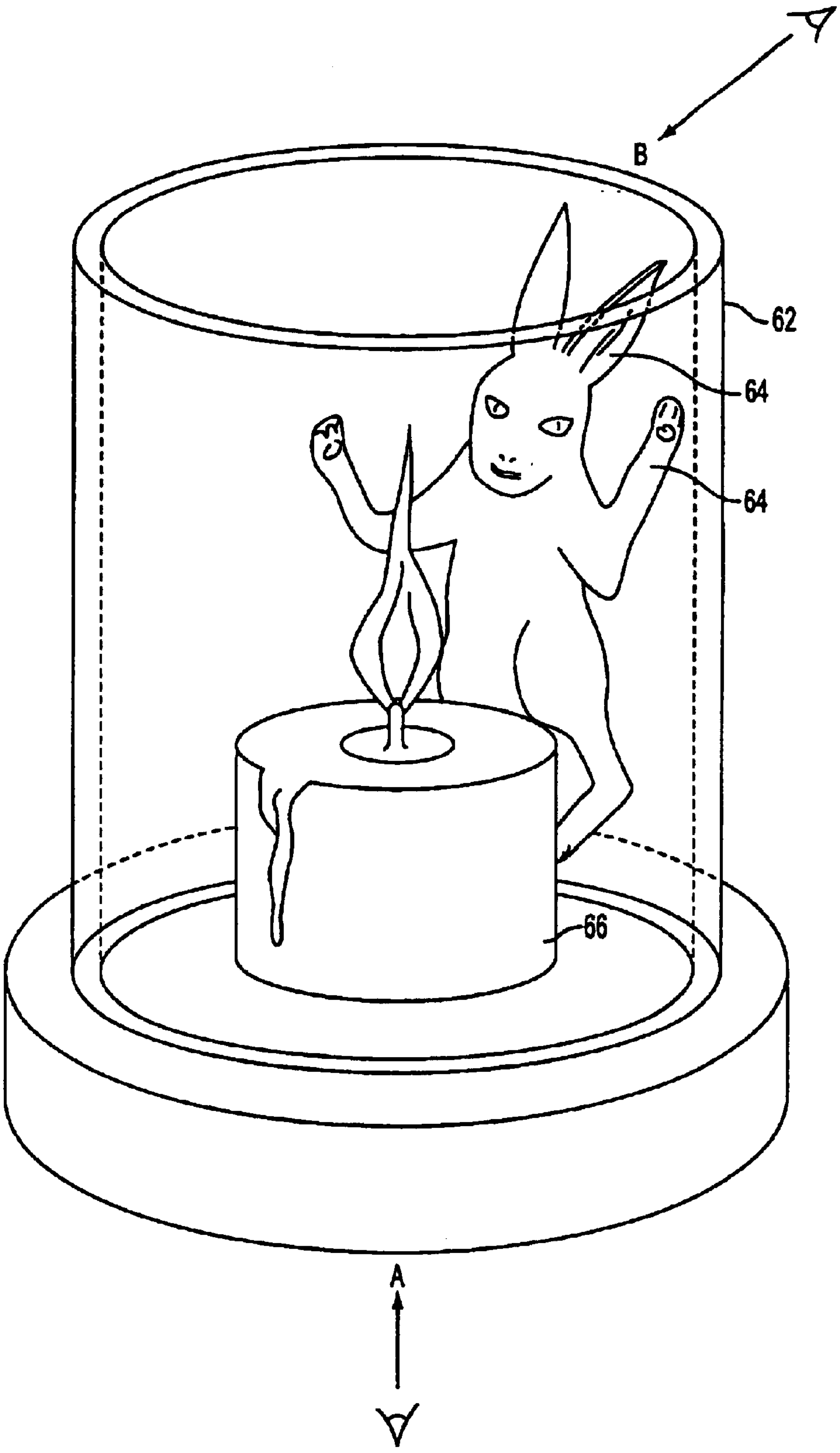

The glass 40 may optionally be pre-heated and/or a separate heating plate, for example having a heated stainless steel surface, may be positioned onto the decal, in a similar manner to the suction deck, to apply the required heat and pressure for transfer of the decal 27C to the glass sheet 40, to leave the desired arrangement of FIG. 14D with decals 27A, 27B and 27C accurately positioned and fixed onto glass sheet 40, typically prior to firing to fuse the ceramic ink onto the glass and optionally temper the glass.

All the figures and their descriptions are purely illustrative and the methods are not limited to those illustrated or the materials described. For example, in any figure in which ceramic ink transfers are described, the methods may be adapted for organic inks onto glass or any other substrate.

It should also be understood that the methods are not restricted to flat substrates, for example they may be applied to the curved windscreens of cars and other vehicles or glass holloware or other curved substrates. For example any of the methods of printing with ceramic ink may be used or adapted to image a glass prism of annular cross section such as may be used to surround a candle or other light source. The imaging surface of the glass substrate may be internal or external. The image may be a conventional image, for example an opaque or translucent design of a flower or herb used in aromatherapy. This glass candle surround may be made into a vision control panel according to GB2 165 292, for example having a design facing inwards on a silhouette pattern which is black facing outwards, so that the candle flame illuminates the design, for example of a cartoon character such as a rabbit apparently warming its hands by the heat of the candle flame, while the candle and flame remain clearly seen from outside. Alternatively the design could be facing outwards only, so that the design and the candle flame can be seen together, providing there is adequate ambient lighting to see the design. Alternatively, there may be one design facing outwards and one design facing inwards. Alternatively, the vision control panel can be according to WO97/25213, having a translucent base pattern so that the design is at least in part illuminated by the candle flame but the flame is clearly visible through the design immediately in the line of sight of the flame.

As further examples the methods may be used for security printing, labels and seals, for example as improvements over the embodiments described in GB2 188 873, and for a variety of display panels.

What is claimed is:

1. A method of imaging an imperforate substrate on a substantially uniform imaging surface of said substrate so as to provide said substrate with a print patter, said print pattern comprising at least two superimposed layers of marking material and being defined by means of 1) said substrate having at least one of said at least two layers of marking material on first portions of said substrate and 2) said substrate being devoid of both of said at least two layers of marking material on other portions of said substrate, said at least two superimposed layers of marking material having at least one length of common boundary within said print pattern, said method including applying at least two initial, continuous, superimposed layers of said marking material onto a substantially imperforate base layer and removing portions of said initial, continuous, superimposed layers of said marking material from said base layer, while maintaining the imperforate nature of said base layer, by means of a force selectively applied to said marking material while said marking material is being supported by said base layer, and wherein said substrate has at least one substantially different material property to said base layer, and wherein at least one of said at least two layers of marking material is applied to said substrate with a surface thereof directly in contact with said imaging surface of said substrate.

2. A method as claimed in claim 1, wherein said at least two layers of marking material are transferred from said base layer to said substrate.

3. A method as claimed in claim 1, wherein said force is selectively applied to a surface of said marking material remote from said base layer.

4. A method as claimed in claim 1, wherein said marking material is transferred from said base layer to said imaging surface of said substrate such that said at least one of said at least two layers of marking material is directly in contact with said imaging surface of said substrate.

5. A method as claimed in claim 1, wherein said base layer is a decal carrier and said at least two initial superimposed layers of said marking material are applied to said decal carrier; parts of said at least two initial superimposed layers of marking material are removed from said decal carrier such that a decal is formed on said decal carrier by non-removed parts of said at least two initial superimposed layers of marking material; and said decal is transferred from said decal carrier to said substrate.

6. A method as claimed in claim 5, wherein said removed parts of said at least two initial superimposed layers of said marking material are removed from said decal carrier before said non-removed parts of said at least two layers of marking material are transferred to said substrate.

7. A method as claimed in claim 1, wherein said substrate is light permeable, and one layer of said at least two layers of marking material is of one colour and the other layer of said at least two layers of marking material is of another colour, and wherein said one layer of said one colour is visible from one side of said substrate and is not visible from the other side of said substrate.

8. A method as claimed in claim 1, wherein said base layer is transmuted into said substrate by application of energy.

9. A method as claimed in claim 8, wherein said energy is thermal energy.

10. A method as claimed in claim 1, wherein said force is a cutting force applied to said at least two initial superimposed layers of said marking material along said at least one length of common boundary of said print pattern.

11. A method as claimed in claim 1, wherein said force is a scraping force.

12. A method as claimed in claim 1, wherein said force is applied by a heated profiled roller, said heated profiled roller having recessed portions from an otherwise cylindrical surface.

13. A method as claimed in claim 12, wherein said at least two initial superimposed layers of marking material are applied to a decal carrier, and said heated profiled roller is applied to a surface of said at least two initial superimposed layers of marking material remote from said decal carrier.

14. A method as claimed in claim 1, wherein said base layer has a primary surface to which said marking material is applied, and wherein said primary surface of said base layer comprises a substantially uniform material.

15. A method as claimed in claim 1, wherein said base layer has a primary surface to which said marking material is applied, and wherein said primary surface of said base layer comprises a plurality of materials.

16. A method as claimed in claim 1, wherein said base layer comprises a substantially different chemical composition than the chemical composition of said substrate.

17. A method as claimed in claim 5, wherein said non-removed parts of said at least two initial superimposed layers of said marking material are transferred by means of a selectively applied suction force.

18. A method as claimed in claim 17, wherein said selectively applied suction force is applied to a surface of said decal remote from said decal carrier.

19. A method as claimed in claim 17, wherein said selectively applied suction force is applied to a surface of said decal carrier remote from said decal.

20. A method as claimed in claim 1, wherein said substantially uniform imaging surface is plane.

21. A method as claimed in claim 1, wherein any cross-section through said substantially uniform imaging surface is of single curvature.

22. The method of claim 1, wherein said substrate is a sheet of glass and said base layer comprises a different material than glass.

23. The method of claim 22, wherein said base layer is applied to said substrate before said at least two layers of marking material are applied onto said base layer.

24. The method of claim 22, wherein said base layer is a carrier onto which said at least two layers of marking material are applied, and said at least two layers of marking material are subsequently applied onto said substrate.

25. The method as claimed in claim 22, wherein said marking material comprises a ceramic ink and wherein said substrate and said ceramic ink undergo a heat treatment process to fuse the ceramic ink into the substrate.

26. A method of imaging an imperforate substrate on a substantially uniform imaging surface of said substrate so as to provide said substrate with a print pattern, said print pattern comprising at least two superimposed layers of marking material and being defined by means of 1) said substrate having at least one of said at least two layers of marking material on first portions of said substrate and 2) said substrate being devoid of both of said at least two layers of marking material on other portions of said substrate, said at least two superimposed layers of marking material having at least one length of common boundary within said print pattern, said method including applying at least two initial, continuous, superimposed layers of said marking material onto a substantially imperforate base layer and removing portions of said initial, continuous, superimposed layers of said marking material from said base layer, while maintaining the imperforate nature of the base layer, by means of a force selectively applied to said marking material while said marking material is being supported by said base layer and wherein said substrate has at least one substantially different material property to said base layer, and transferring marking material remaining on said base layer to said first portions of said substrate, and wherein at least one of said at least two layers of marking material is applied to said substrate with a surface thereof directly in contact with said imaging surface of said substrate.

27. A method of imagining an imperforate substrate on a substantially uniform imaging surface of said substrate so as to provide said substrate with a print pattern, said print pattern comprising at least two superimposed layers of marking material and being defined by means of 1) said substrate having at least one of said at least two layers of marking material on first portions of said substrate and 2) said substrate being devoid of both of said at least two layers of marking material on other portions of said substrate, and said at least two superimposed layers of marking material having at least on length of common boundary within said print pattern, said method including applying at least two initial, continuous, superimposed layers of said marking material onto a base layer, transferring said at least two initial, continuous, superimposed layers of said marking material to said substrate by means of a force selectively applied to said marking material while said marking material is being supported by said base layer, and wherein said substrate has at least one substantially different material property to said base layer, and removing portions of said initial, continuous, superimposed layers of said marking material from said substrate, and wherein at least one of said at least two layers of marking material is applied to said substrate with a surface thereof directly in contact with said imaging surface of said substrate.

28. A method of imaging an imperforate substrate on a substantially uniform imaging surface of said substrate so as to provide said substrate with a print pattern, said print pattern comprising at least two superimposed layers of marking material and being defined by means of 1) said substrate having at least one of said at least two layers of marking material on first portions of said substrate and 2) said substrate being devoid of both of said at least two layers of marking material on other portions of said substrate, and said at least two superimposed layers of marking material having at least one length of common boundary within said print pattern, said method including applying a base layer to said imaging surface of said substrate, applying at least two initial, continuous, superimposed layers of said marking material onto said base layer, and removing portions of said initial, continuous, superimposed layers of said marking material from said base layer by means of a force selectively applied to said marking material while said marking material is being supported by said base layer, and wherein said substrate has at least one substantially different material property to said base layer, and wherein said base layer is removed from said substrate by being burnt off in a glass tempering regime leaving at least one of said at least two layers of marking material applied to said substrate with a surface thereof directly in contact with said imaging surface of said substrate.

29. A method of forming an imperforate transmuted substrate having a print pattern on a substantially uniform imaging surface of said transmuted substrate, said print pattern comprising at least two superimposed layers of marking material and being defined by said transmuted substrate 1) having at least one of said at least two layers of marking material on first portions of said transmuted substrate and 2) said transmuted substrate being devoid of both of said at least two layers of marking material on other portions of said transmuted substrate, and said at least two superimposed layers of marking material having at least one length of common boundary within said print pattern, said method including applying at least two initial, continuous, superimposed layers of said marking material onto a starting substrate and removing portions of said initial, continuous, superimposed layers of said marking material from said starting substrate by means of a force selectively applied to said marking material while said marking material is being supported by said starting substrate, and wherein said removing portions of said initial, continuous, superimposed layers of said marking material includes (i) pre-cutting said superimposed layers with incisions and (ii) removing said portions of said initial, continuous superimposed layers of said marking material between said incisions, and wherein said starting substrate is transmuted by means of energy applied to said starting substrate such that the transmuted substrate has at least one substantially different material property than said starting substrate, and wherein at least one of said at least two layers of marking material is applied to said starting substrate with a surface thereof directly in contact with a surface of the starting substrate that is transmuted into said imaging surface of said transmuted substrate.

* * * * *

UNITED STATES PATENT AND TRADEMARK OFFICE

CERTIFICATE OF CORRECTION

PATENT NO. : 6,824,639 B1 
DATED : November 30, 2004
INVENTOR(S) : Roland G. Hill et al.

It is certified that error appears in the above-identified patent and that said Letters Patent is hereby corrected as shown below:

Title page,
Item [60], Related U.S. Application Data, add the following information:
-- Provisional Application No. 60/118,480, filed on February 3, 1999. --.

Signed and Sealed this

Fifth Day of April, 2005

JON W. DUDAS
*Director of the United States Patent and Trademark Office*